US010951532B2

(12) United States Patent
Chen et al.

(10) Patent No.: US 10,951,532 B2
(45) Date of Patent: Mar. 16, 2021

(54) METHOD AND SYSTEM FOR CLUSTER RATE LIMITING IN A CLOUD COMPUTING SYSTEM

(71) Applicant: Huawei Technologies Co., Ltd., Shenzhen (CN)

(72) Inventors: Hongwu Chen, Scarborough (CA); Gui Fu, Markham (CA); Zhenhua Hu, Toronto (CA); Zhike Zhang, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 281 days.

(21) Appl. No.: 16/038,826

(22) Filed: Jul. 18, 2018

(65) Prior Publication Data

US 2020/0028788 A1 Jan. 23, 2020

(51) Int. Cl.
*H04L 12/815* (2013.01)
*H04L 12/825* (2013.01)
*H04L 12/861* (2013.01)
*H04L 12/24* (2006.01)
*H04L 12/819* (2013.01)
*H04L 29/08* (2006.01)

(52) U.S. Cl.
CPC ........ *H04L 47/225* (2013.01); *H04L 41/0896* (2013.01); *H04L 47/215* (2013.01); *H04L 47/25* (2013.01); *H04L 49/90* (2013.01); *H04L 67/10* (2013.01)

(58) Field of Classification Search
CPC .................................................... H04L 47/255
See application file for complete search history.

(56) References Cited

U.S. PATENT DOCUMENTS

| 9,654,483 | B1 * | 5/2017 | Benson | ............... | H04L 63/1458 |
| 2012/0011244 | A1 * | 1/2012 | Zhu | ........................ | G06F 21/105 |
| | | | | | 709/224 |
| 2013/0188485 | A1 * | 7/2013 | Midani | ................ | H04L 47/527 |
| | | | | | 370/235 |
| 2017/0026295 | A1 | 1/2017 | Yin et al. | | |

FOREIGN PATENT DOCUMENTS

CN 104980367 A 10/2015
CN 107800644 A 3/2018

* cited by examiner

*Primary Examiner* — Kodzovi Acolatse
*Assistant Examiner* — Abdeltif Ajid
(74) *Attorney, Agent, or Firm* — Slater Matsil, LLP

(57) ABSTRACT

Systems and methods for rate limiting one or more clusters of service instances using at least one rate limit controller are described herein. A token distribution is determined for each one of a plurality of rate limiters. The token distribution comprising a maximum number of tokens and a token generating rate. The maximum number of tokens and the token generating rate are assigned to each one of the plurality of rate limiters. At least one request for additional tokens is received from at least a given one of the plurality of rate limiters. The token distribution of at least the given one of the plurality of rate limiters is adjusted based on the request and on token consumption information of at least the given one of the plurality of rate limiters. An adjusted token distribution is assigned to the given one of the plurality of rate limiters.

20 Claims, 13 Drawing Sheets

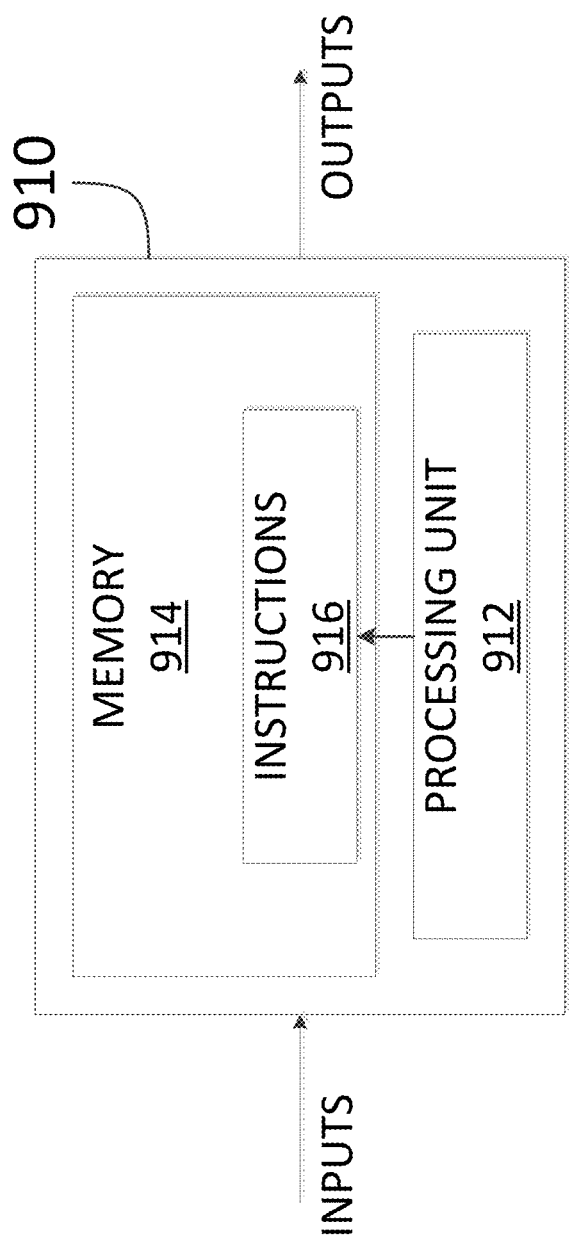

METHOD AND SYSTEM FOR CLUSTER RATE LIMITING IN A CLOUD COMPUTING SYSTEM

TECHNICAL FIELD

The present disclosure relates generally to rate limiting service instances within clusters of service instances provisioned by a cloud computing system, and, more particularly, to rate limiting service instances of distributed computing multiple clusters using tokens.

BACKGROUND OF THE ART

Cloud computing is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally provision three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g. processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis.

In a distributed computing environment, such as cloud computing, there is a need to control the rate of traffic when requests from multiple tenants, applications, application programming interface (API) calls and/or downloading/uploading operations share the same network or disk input/output bandwidth. Controlling the rate of traffic may inhibit one or more requests from taking over the majority of the bandwidth as well as prevent denial-of-service (DoS) attacks. This may be achieved by limiting the number of requests per time interval, the bandwidth per second, and/or the number of concurrent connections.

When a large number of requests is served by a cluster of service instances provided with a load balancer, rate limiting each node of the cluster of service instances (e.g. using a counter algorithm, a sliding window algorithm, a leaky bucket algorithm, or a token bucket algorithm) is not suitable due to, for example, an overburdening of the service (e.g. a backend service), an increased memory overhead, a lack of support of priority of requests, or a lack of smoothness in the effect of rate limiting. It is instead more appropriate to perform cluster rate limiting, in which rate limiters are used to rate limit clusters of service instances. However, in existing cluster rate limiting solutions, in order for each rate limiter associated with a given service instance to know whether to accept or reject a request, each rate limiter has to verify, for every request, a central configuration parameter and a counter saved in a shared location (e.g. a Redis™ or Cassandra™ database). This causes the rate limiters to generate traffic that consumes bandwidth, leading to bandwidth and latency overhead issues.

To avoid these issues, tokens can be evenly distributed to each service instance or tokens can be provided to a given service instance periodically or when its tokens are used up. However, because it is desirable for a load balancer provided in front of a cluster of service instances to have low latency, it becomes impossible for the load balancer to act as a rate limiter or to look into each request in order to evenly distribute requests based on rate limiting rules (e.g. from a tenant, an application, or an API) to service instances. The load balancer usually only uses simple rules, such as a round robin scheme, for distributing requests to the service instances as fast as possible without knowing rate limits. The distribution may be balanced for request serving, but unbalanced for rate limiting. Such unbalanced distribution for rate limiting typically causes inaccurate rate limiting if each rate limiter makes decisions by merely considering its own tokens, i.e. without knowledge of the manner in which the requests are handled in the cluster of service instances.

An additional disadvantage of existing cluster rate limiting solutions is the lack of coordination between instances of frontend services and instances of backend services. In particular, in cases where instances of frontend services call instances of backend services, rate limiting between the two is typically not coordinated, causing the instances of backend services to become overloaded when additional loads are received from the instances of frontend services.

As such, there is a need for improved systems and methods for rate limiting of clusters of service instances provisioned in distributed computing environments.

SUMMARY

Systems and method for rate limiting one or more clusters of service instances are described herein.

In one aspect, there is provided a method of rate limiting clusters of service instances in a cloud computing system. The method includes: receiving, at a rate limit controller, a request to determine a token distribution for each one of a plurality of rate limiters, each rate limiter associated with one of the clusters of service instances, each one of the plurality of rate limiters rate limit a service instance of a corresponding one of the service instance clusters; determining, at the rate limit controller, the token distribution for each one of the plurality of rate limiters, the token distribution comprising a maximum number of tokens and a token generating rate; outputting, by the rate limiting controller, the maximum number of tokens and the token generating rate to each one of the plurality of rate limiters; receiving, from at least a given one of the plurality of rate limiters, at least one request for additional tokens; and outputting an adjusted token distribution to a given one of the plurality of rate limiters based on the request and on token consumption information for at least the given one of the plurality of rate limiters.

In some aspects, the adjusted token distribution is determined based on overall token consumption information of the plurality of rate limiters.

In some aspects, determining the token distribution for each one of the plurality of rate limiters comprises determining a total number of tokens to be assigned to the plurality of rate limiters, the total number of tokens lower than or equal to a maximum number of available tokens for the plurality of rate limiters.

In some aspects, the total number of tokens to be assigned to the plurality of rate limiters is determined for each one of a plurality of rate limiting dimensions.

In some aspects, determining the token distribution further comprises obtaining a remaining number of tokens by computing a difference between the maximum number of available tokens and the total number of tokens.

In some aspects, determining the token distribution comprises determining a total token generating rate to be assigned to the plurality of rate limiters, the total token generating rate lower than or equal to a maximum token generating rate of the plurality of rate limiters.

In some aspects, determining the token distribution further comprises obtaining a remaining token generating rate by computing a difference between the maximum token generating rate and the total token generating rate.

In some aspects, determining the token distribution comprises determining a total number of tokens for a plurality of rate limits of a first cluster of service instances, the total number of tokens lower than or equal to a maximum number of tokens for the first cluster of service instances, determining a total token generating rate for the plurality of rate limits, the total token generating rate is lower than or equal to a maximum token generating rate for the first cluster of service instances; and determining the token distribution for each one of a plurality of rate limiters from the maximum number of tokens and the maximum token generating rate for each one of a plurality of rate limits.

In some aspects, each one of the plurality of rate limits is rate limiting a given one of a plurality of rate limiting dimensions.

In some aspects, adjusting the token distribution comprises, determining an additional number of tokens to provide to the given one of the plurality of rate limiters for the maximum number of tokens based on the remaining number of tokens and the token consumption information of at least the given one of the plurality of rate limiters, reducing the remaining number of token by the additional number of tokens, and increasing the maximum number of tokens by the additional number of tokens for the given one of the plurality of rate limiters.

In some aspects, determining the additional number of tokens comprises determining the additional number of tokens to provide to the given one of the plurality of rate limiters based on overall token consumption information of the plurality of rate limiters.

In some aspects, determining the additional number of tokens comprises determining the additional number of tokens to provide to the given one of the plurality of rate limiters as a function of the remaining number of tokens.

In some aspects, the method further includes determining, at the rate limiting controller, that the remaining number of tokens is zero and requesting that the given one of the plurality of rate limiters wait for a time interval to elapse prior to requesting additional tokens.

In some aspects, the method further includes determining, at the rate limiting controller, that the remaining number of tokens is less than a threshold value and requesting a return of tokens from one or more of the plurality of rate limiters.

In some aspects, the one or more clusters of service instances comprises a cluster of backend service instances and a cluster of frontend service instances, and the method further comprising after determining that the cluster of backend service instances is overloaded, throttling requests received from service instances of the cluster of frontend service instances for service instances of the cluster of backend service instances.

In some aspects, the given one of the plurality of rate limiters stores incoming requests into a queue associated with a rate limiter when a current number of tokens of a rate limit is zero.

In some aspects, the queue is a first queue and the given one of the of the plurality of rate limiters allocates to the first queue unused tokens of a second queue when the first queue has pending requests.

In some aspects, there is provided a non-transitory computer readable medium storing computer readable instructions, which when executed by a processor, cause the processor to: receive a request to determine a token distribution for each one of a plurality of rate limiters, each rate limiter associated with one of the clusters of service instances, each one of the plurality of rate limiters rate limit a service instance of a corresponding one of the service instance clusters, determine the token distribution for each one of the plurality of rate limiters, the token distribution comprising a maximum number of tokens and a token generating rate, output the maximum number of tokens and the token generating rate to each one of the plurality of rate limiters, receive, from at least a given one of the plurality of rate limiters, at least one request for additional tokens; and output an adjusted token distribution to a given one of the plurality of rate limiters based on the request and on token consumption information for at least the given one of the plurality of rate limiters.

DESCRIPTION OF THE DRAWINGS

Reference is now made to the accompanying figures in which:

FIG. 7 is a schematic diagram of an example of a physical machine of the IaaS of the cloud computing architecture of FIG. 1A in accordance with an embodiment.

It will be noted that throughout the appended drawings, like features are identified by like reference numerals.

DETAILED DESCRIPTION

Figure 1A:
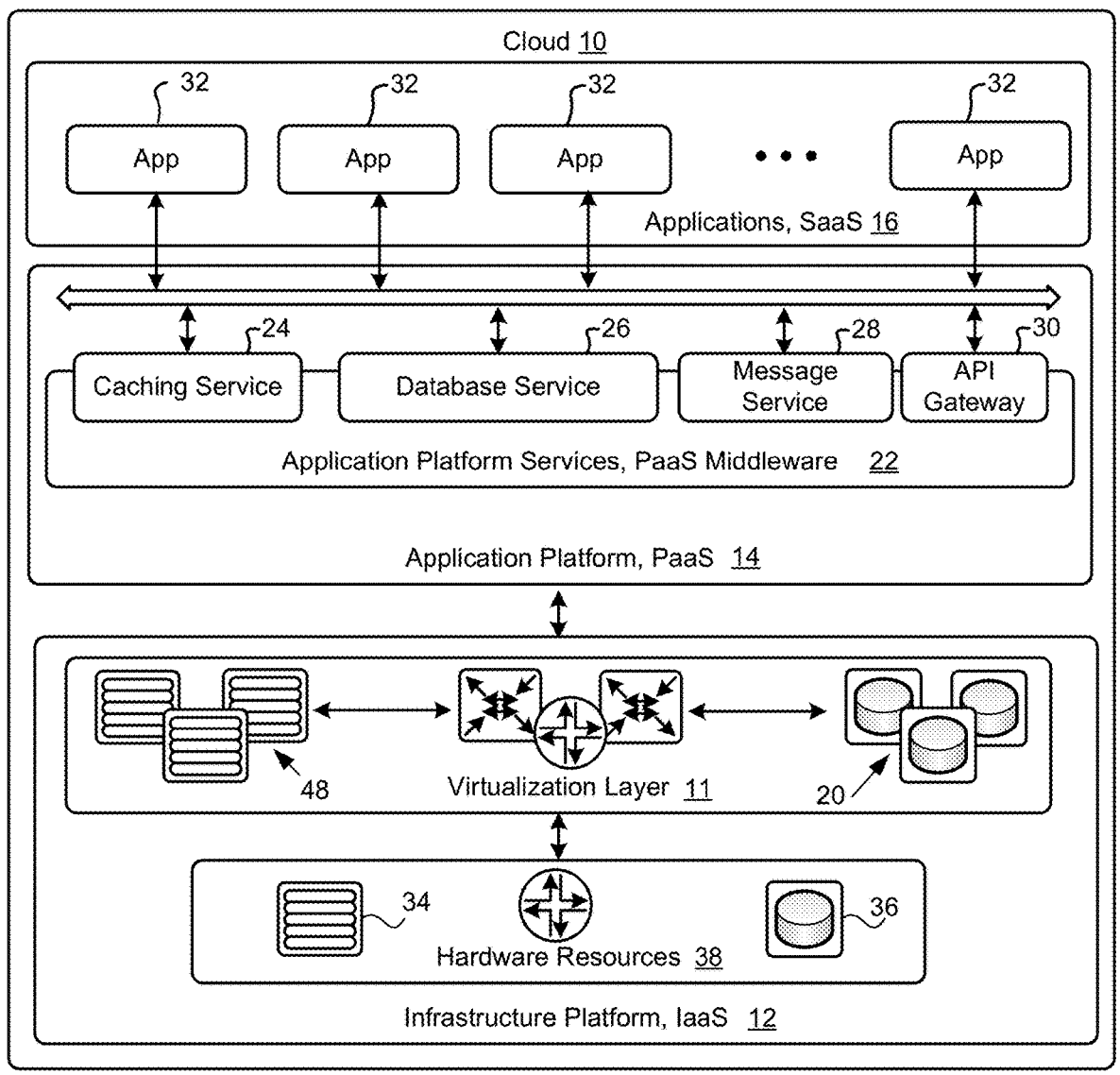
FIG. 1A is a block diagram illustrating a cloud computing architecture for provisioning cloud computing services in accordance with an embodiment.

FIG. 1A is a logical block diagram schematically illustrating a cloud computing architecture that can provision cloud computing services. The illustrated logical diagram of the cloud computing architecture 10 (referred to hereinafter as the cloud 10) generally comprises an infrastructure platform 12 (e.g. IaaS layer), an application platform 14 (e.g. PaaS layer), and applications 16 (e.g., SaaS layer). The infrastructure platform 12 comprises the physical hardware resources 38, and a virtualization layer 11 that presents an abstraction of the physical hardware resources 38 to the application platform 14. The abstraction presented by the virtualization layer 11 depends on the requirements of the applications 32 being hosted on the application platform 14. The physical hardware resources 38 include physical machines 34 that include processing resources (e.g., central processing units (CPUs), graphic processing units (GPUs), accelerators, tensor processing units (TPUs)), physical storage 36 that include storage resources such as memory (e.g., static random access memory (SRAM), dynamic random access memory (DRAM), synchronous DRAM (SDRAM), read-only memory (ROM), persistent storage devices (e.g. hard disk drives, optical drives) or a combination thereof), and networking resources (not shown) that are generally resident within a data center. A data center, as will be understood in the art, includes a collection of the physical hardware resources 38 (typically in the form of servers) that can be used as a collective computing resource comprising processing, storage, and networking resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

The virtualization layer 11 supports a flexible and efficient multi-tenant run-time and hosting environment for applications 32 by providing Infrastructure as a Service (IaaS) facilities. The virtualization layer 11 includes a virtualization manager or hypervisor (not shown) that may provide a security and resource "sandbox" for each application 32 being hosted by the application platform 14. Each "sandbox" may be implemented as a Virtual Machine (VM) 48 that may include an appropriate operating system and controlled access to virtualized storage resources 20.

The virtualization of the physical hardware resources 38 by the virtualization layer 11, is considered to be foundational technology for the cloud 10. Virtualization of is a technology that allows for the creation of virtual computing resource pools of computing resources (e.g., processing, storage, and networking resources) connected to each by connectivity resources. Virtualization may take the form of instantiating VMs 48 that, to another entity on a network and to software executed on the VM 48, is no different than a physical computing device. A VM 48 has its own set of computing resources (e.g. processing, storage, and connectivity resources), upon which an operating system can be executed. The VM 48 can have a virtual network interface that can be assigned a network address. Between the underlying resources and the VM 48, there is typically a hypervisor (not shown) that manages the resource isolation and network interactions. One of the purposes of a VM 48 is to provide isolation from other processes running on the cloud 10. When initially developed, a VM 48 was a mechanism to allow different processes to operate without concern that a single errant process would be able to cause a complete system crash. Instead, an errant process would be contained to its own VM 48. This isolation allows for each VM 48 to have its own set of network interfaces. Typically, a single underlying computing resource can support a plurality of virtualized entities.

It will be appreciated by those skilled in the art that a more recent development has been the use of containers in place of VMs 48. As mentioned above, each VM 48 typically includes its own operating system which typically increases redundant computing, storage, and connectivity resource usage. Containers allow a single OS kernel to support a number of isolated applications. In place of a hypervisor that allows each VM 48 to run its own OS, a single OS hosts containers that are responsible for enforcing the resource isolation that would otherwise be provided by the VM 48.

The application platform 14 provides the capabilities for hosting applications 32 and includes application platform services 22. The application platform services 22 provide a set of middleware application services and infrastructure services to the applications 32 hosted on the application platform 14. Applications 32 hosted on the application platform 14 may run on either the VMs or the physical machines. In the embodiment depicted in FIG. 1A, the application platform services 22 include a cloud caching service system 24 for in-memory data storage, a database service 26 for applications, a message service 28 for publishing messages to subscriber customers, an application program interface (API) gateway service 30 and a rate limit control service 100. The API gateway service 30 enables customers to create, publish, and maintain application program interfaces (APIs) to access other cloud services. It will be appreciated by those skilled in the art that the application platform services 22 may provide other middleware application services to customers, such as notification services, run-time services, and the like. Applications 32 from customers may be deployed and executed within a respective VM 48 or physical machine 34.

Figure 1B:
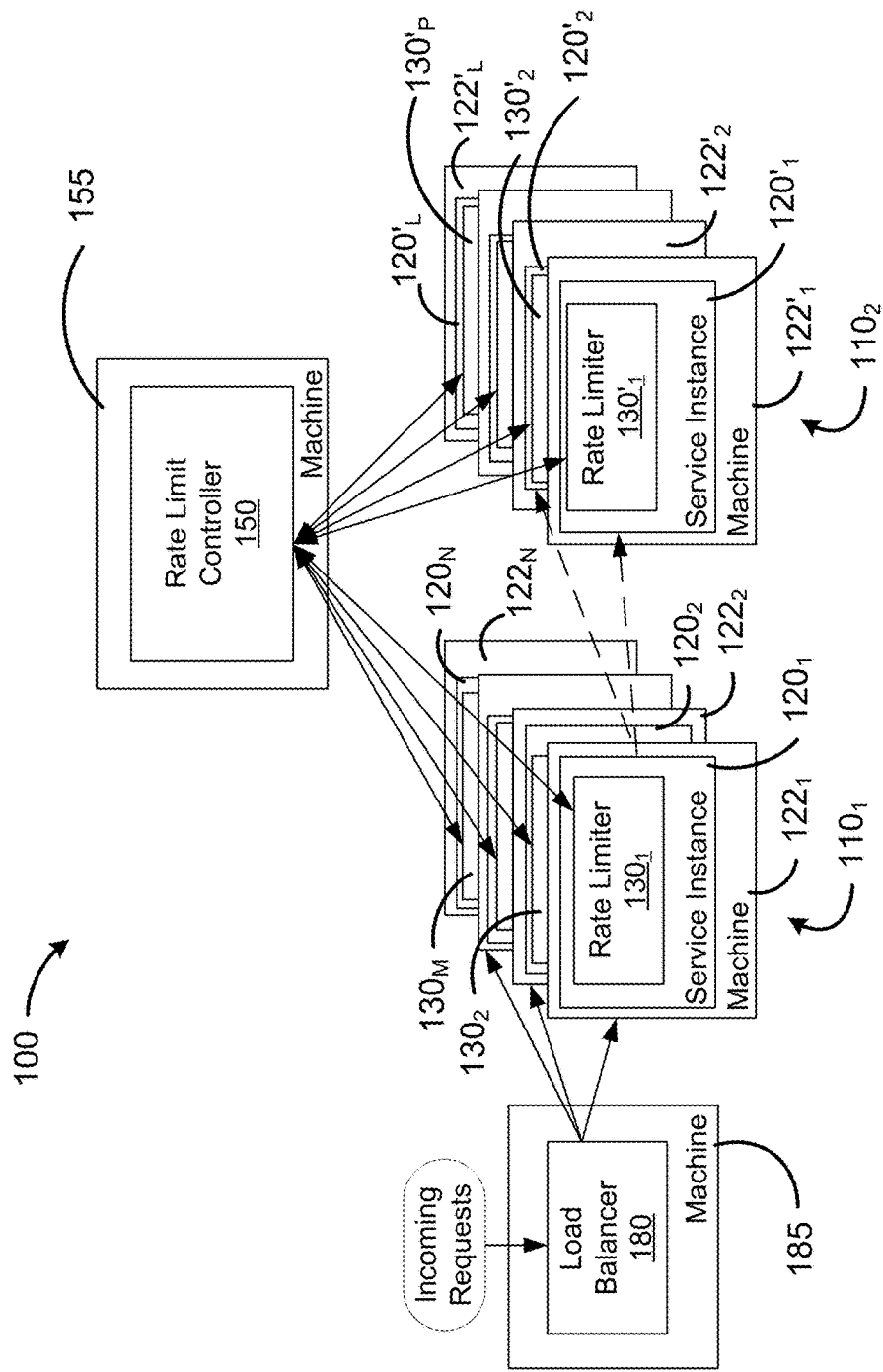
FIG. 1B is a logical block diagram of a rate limit controller and rate limiters for rate limiting service instances within clusters of service instances in accordance with an embodiment.

FIG. 1B illustrates a logical block diagram of a rate limit control service 100 of the cloud 10. The rate limit control service 100 comprises a first cluster of service instances $110_1$ (hereinafter "first cluster $110_1$") and a second cluster of service instances $110_2$ (hereinafter "second cluster $110_2$"). The first cluster $110_1$ comprises a first plurality of service instances $120_{1,2,\ldots N}$. As used herein, the term service instance refers to an instantiation of a service running in an execution environment of the cloud 10. There may be multiple instances of a same service running in a same execution environment of the cloud and/or on different multiple execution environments of the cloud 10. Each of the service instances $120_{1,2,\ldots N}$ may be implemented by a machine $122_{1,2,\ldots N}$, which may be a virtual machine 48 or a physical machine 34. The first cluster $110_1$ of service instances (hereinafter the first cluster $110_1$) comprises a first plurality of rate limiters $130_{1,2,\ldots,M}$ for rate limiting the first plurality of service instances $120_{1,2,\ldots,N}$. Similarly, the second cluster $110_2$ of service instances (hereinafter second cluster $110_2$) comprises a second plurality of service instances $120'_{1,2,\ldots,L}$ and a second plurality of rate limiters $130'_{1,2,\ldots,P}$ for rate limiting the second plurality of service instances $120'_{1,2,\ldots,L}$. Each of the service instances $120'_{1,2,\ldots,L}$ may be implemented by a machine $122_{1,2,\ldots,L}$, which may be a virtual machine 48 or a physical machine 34. The number M of rate limiters of the first plurality of rate limiters $130_{1,2,\ldots,M}$ and the number N of service instances of the first plurality of service instances $120_{1,2,\ldots,N}$ may vary from each other or may have the same value. Similarly, the number P of rate limiters of the second plurality of rate limiters $130'_{1,2,\ldots,P}$ and the number L of service instances of the second plurality of service instances $120'_{1,2,\ldots,L}$ may vary from each other or may have the same value. While FIG. 1B illustrates that each service instance has a rate limiter associated therewith, this is for example purposes and other configurations are possible on practical implementations.

The first and second clusters $110_1$, $110_2$ may be implemented in a similar manner. Taking the first cluster $110_1$ as an example, the service instances $120_{1,2,\ldots,N}$ may be used for any suitable service provisioned by the cloud 10. For example, the service instances $120_{1,2,\ldots,N}$ may be used for processing of one or more applications, processing of requests (e.g., Hypertext Transfer Protocol (HTTP) requests, API requests, request from tenants, application requests), file download and/or upload operations and/or any other suitable operation. Each rate limiter $130_{1,2,\ldots,M}$ has a token distribution for rate limiting a service instance $120_{1,2,\ldots,N}$. The token distribution is discussed in further detail elsewhere in this document. Rate limiting may comprise limiting a number of requests from clients to services instances per unit of time (e.g., requests per second, requests per minute, request per hour, request per day, etc.), limiting network bandwidth between clients and service instances (e.g., a number of KB, MB, GB per second, etc.), limiting concurrent connections from clients to service instances and/or any other suitable rate limit. In some embodiments, as illustrated in FIG. 1B, the first plurality of service instances $120_{1,2,\ldots,N}$ are frontend service instances and the second plurality of service instances $120'_{1,2,\ldots,L}$ are backend service instances. One or more of the frontend service instances may request processing from one or more of the backend service instances. An example of a frontend service instances are service instances of a web server and an example of a backend service instances are service instances of an application server.

The two clusters $110_1$, $110_2$ shown in FIG. 1B are for example purposes only and it should be understood that the rate limiter control service 100 may comprise any suitable number of clusters of service instances. Accordingly, each cluster comprises a plurality of service instances and each one of a plurality of rate limiters are configured for rate limiting a service instance of a corresponding one of the one or more distributed computing clusters A load balancer 180 is configured to receive incoming requests and distribute the incoming requests to the service instances $120_{1,2,\ldots,N}$ in any suitable manner. The incoming requests may be from one or more client computing devices accessing the cloud 10 via a communication network, such as the Internet, or from another service provisioned by the cloud 10. The load balancer 180 may be implemented in dedicated software and/or hardware (e.g., a multilayer switch, a domain name system server process and/or any other suitable configuration of software and/or hardware). The load balancer 180 may be implemented in a distributed manner. The load balancer 180 may be implemented by a machine 185, which may be a virtual machine 48 or a physical machine 34.

A rate limit controller 150 is configured to oversee and dynamically control operation of the rate limiters $130_{1,2,\ldots,M}$, $130'_{1,2,\ldots,P}$. The rate limit controller 150 may be implemented using dedicated software and/or hardware. The rate limit controller 150 may be implemented in a distributed manner (e.g. multiple load balancers can be implemented for functionalities of a logical load balancer to provide better scalability). While only a single rate limit controller 150 is illustrated in FIG. 1B, in some embodiments, multiple rate limit controllers 150 may be used. For instance, a plurality of rate limit controllers 150 may have partitioned rate limits (e.g., using consistent hashing) for rate limiting the service instances $120_{1,2,\ldots,N}$, $120'_{1,2,\ldots,L}$. The rate limiters $130_{1,2,\ldots,M}$, $130'_{1,2,\ldots,P}$ may be configured to operate in parallel (e.g., for scalability). The rate limit controller 150 may be implemented by software executing on a machine 155, which may be a virtual machine 48 or a physical machine 34.

Figure 2:
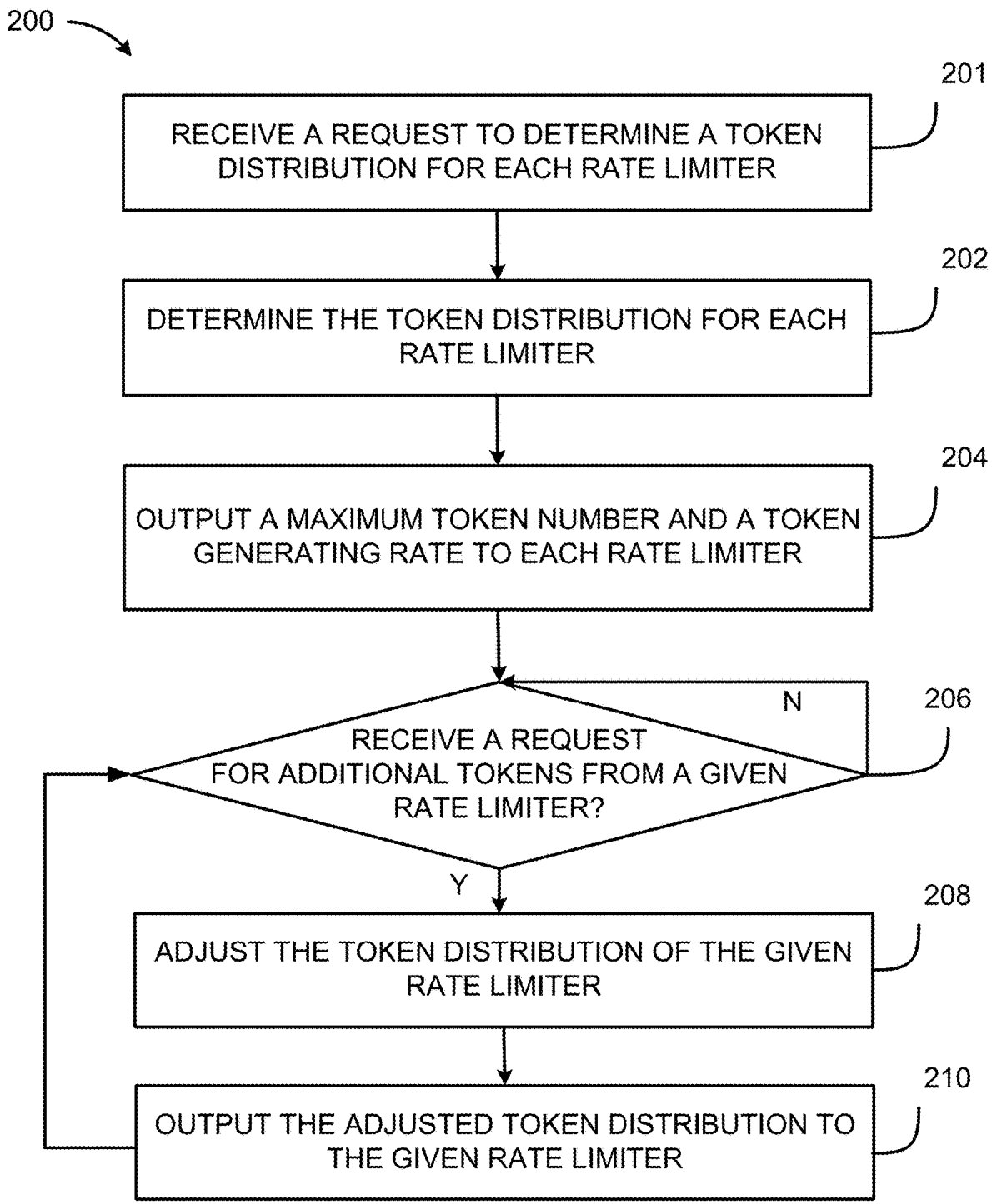
FIG. 2 is a flowchart illustrating an example method for rate limiting one or more clusters of service instances in accordance with an embodiment.

With reference to FIG. 2, there is shown a flowchart illustrating an example method 200 for rate limiting one or more clusters of service instances. In accordance with an embodiment, the method 200 is implemented by the rate limit controller 150 for rate limiting the first plurality of service instances $120_{1,2,\ldots,N}$ of FIG. 1B. While the method 200 is herein explained with reference to the first cluster $110_1$, this is for example purposes. The method 200 may be performed for rate limiting one or more clusters of service instances such as, but not limited to, the first and second clusters $110_1$, $110_2$. Moreover, while the method 200 is herein explained with reference to the rate limit controller 150, this is for example purposes. The method 200 may be performed by a plurality of rate limit controllers, depending on practical implementations.

At step 201, the rate limit controller 150 receives a request to determine a token distribution for each one of the rate limiters $130_{1,2,\ldots,M}$. The request may be received from a computing device used by a cloud system administrator for configuring the rate limit controller 150. For example, a computing device associated with a cloud system administrator may send the request to rate limit controller 150 in order to configure the rate limit controller 150. By way of another example, the request may be automatically generated when services are purchased by users of the cloud 10 and provisioned in the cloud 10. The request may specify a rate limit that the token distribution for each one of the rate limiters $130_{1,2,\ldots,M}$ is based thereon. As used herein, the term rate limit refers to a criteria for rate limiting the service instances $120_{1,2,\ldots,N}$. The rate limit may be for rate limiting a tenant, an application, an API, a bandwidth of the network connecting clients to service instances provisioned in the cloud 10 (e.g. 20 MB/s of data transferred from clients to service instances), number of concurrent connections between clients and service instances provisioned in the cloud 10, or a combination thereof. Clients can be computing devices of users of the cloud 10 that are connected to and access the cloud 10 using the Internet or other service instances provisioned in the cloud 10. Other types of rate limits are contemplated. As used herein, the term tenant refers to at least one user (e.g., an organization, a division, a group of users, etc.) having access to services provisioned in the cloud 10 with specific privileges. The rate limits of a given type (e.g., tenant, application, etc.) may be referred to as a rate limit dimension. Requests to determine the token distribution may be periodically received, for example, each time a new rate limit is added and/or removed from the rate limiting service 100.

At step 202, the rate limit controller 150 determines the token distribution for each one of the rate limiters $130_{1,2,\ldots M}$, the token distribution comprising a maximum token number and a token generating rate for each rate limiter $130_{1,2,\ldots M}$. As used herein, the term token refers to a unit of measure for rate limiting service instances. For example, each token may correspond to a number of requests, an amount of bandwidth, a number of concurrent connections and/or any other suitable unit of measure. The maximum token number refers to a maximum number of tokens that is distributed to a given rate limiter. A rate limiter at any given time maintains a current number of tokens and decreases the current number of tokens each time a token is used. The current number of tokens may be considered as part of the token distribution. As used herein, the term token generating rate refers to a re-generation rate of tokens for a unit of time. The current number of tokens of a given rate limiter is re-generated at the token generating rate until the maximum token number is reached. The maximum token number and the token generating rate (i.e. the token distribution) may vary for each one of the rate limiters $130_{1,2,\ldots M}$, depending on practical implementations.

Each rate limiter $130_{1,2,\ldots M}$, may be thought of in a similar manner to a bucket for holding water. The bucket has a maximum capacity (i.e., the maximum token number), a refiling rate (i.e., the token generating rate) and a current level (i.e., the current number of tokens). For example, as water is poured out of the bucket (i.e., as tokens are used) the current level of water of the bucket decreases (i.e., the current number of tokens decreases). As the bucket is not full, water is added back into the bucket (i.e., the current number of tokens increases) at the refiling rate (i.e., the token generating rate) until the maximum capacity (i.e., the maximum token number) of the bucket is reached.

At step 204, the rate limit controller 150 outputs the maximum token number and the token generating rate (i.e., the token distribution) to each one of the rate limiters $130_{1,2,\ldots N}$. For example, a first rate limiter $130_1$ may be assigned, by the rate limiting controller 150, 100 tokens as the maximum token number and a token generating rate of 10 tokens per minute and a second rate $130_2$ limiter may be assigned, by the rate limiting controller 150, 200 tokens as the maximum token number and a token generating rate of 15 tokens per minute.

At step 206, the rate limit controller 150 receives a request for additional tokens from a given one of the rate limiters $130_{1,2,\ldots M}$. For the sake of example, the given rate limiter may be the first rate limiter $130_1$. The request from the first rate limiter $130_1$ may comprise token consumption information. The token consumption information may comprise the current number of tokens of the first rate limiter $130_1$. The token consumption information may comprise a consumption rate of the tokens of the first rate limiter $130_1$. As used herein, the term consumption rate refers to an average rate of consumption of tokens over a period of time. The token consumption information may comprise historical data. As used herein, the term historical data refers to information identifying the number of tokens consumed historically over a period of time. It should be understood that the request may be received from any one of the rate limiters $130_{1,2,\ldots M}$ in a similar manner.

At step 208, the rate limit controller 150 adjusts the token distribution of the given rate limiter to obtain an adjusted token distribution. Continuing with the example of the given rate limiter being the first rate limiter $130_1$, the token distribution of the first rate limiter $130_1$ is adjusted at step 208 based on the request at step 206 and at least consumption information of the first rate limiter $130_1$. In accordance with an embodiment, the token distribution of the first rate limiter $130_1$ is also adjusted based on overall token consumption information of the rate limiters $130_{1,2,\ldots N}$. For example, token consumption information may be collected from one or more of the rate limiters $130_{1,2,\ldots M}$, e.g., each time a rate limiter requests additional tokens and provides token consumption information. The token consumption information may be processed to determine trends in token consumption by the rate limiters $130_{1,2,\ldots M}$. The trends may be used to adjust the token distribution of the first rate limiter $130_1$ and an adjusted token distribution is then obtained for the first rate limiter $130_1$.

The adjusted token distribution may comprise an adjustment of the maximum token number and/or of the token generating rate for the given rate limiter. For example, the maximum token number for the first rate limiter $130_1$ may be increased and/or the token generating rate for the first rate limiter $130_1$ may be increased. The adjustment of the maximum token number and/or the token generating rate may be a temporary adjustment (e.g. for a given period of time). For example, after the period of time has elapsed, the maximum token number and/or the token generating rate may be returned to their original values (e.g. values prior to the adjustment). The adjusted token distribution may also comprise an adjustment to the current number of tokens of the first rate limiter $130_1$. For example, an additional number of tokens may be assigned to the first rate limiter $130_1$, and the first rate limiter $130_1$ may then increase the current number of tokens by the additional number of tokens. The adjusting of the token distribution may comprise increasing the current number of tokens without increasing the maximum token number. Alternatively, the adjusting of the token distribution may comprise increasing the current number of tokens and also increasing the maximum token number. For example, if the maximum token number for the first rate limiter $130_1$ is increased from 10 tokens to 15 tokens, the current number of tokens of the first rate limiter $130_1$ may be increased by 5 tokens. Adjustment of the token distribution of any one of the rate limiters $130_{1,2,\ldots N}$ may be done in a similar manner to that described with reference to the first rate limiter $130_1$. The adjustment of the token distribution(s) may vary depending on practical implementations.

At step 210, the rate limit controller 150 outputs the adjusted token distribution to the given rate limiter. Continuing with the example of the given rate limiter being the first rate limiter $130_1$, the rate limit controller 150 may output an adjusted number of tokens and/or an adjusted token generating rate to the first rate limiter $130_1$. The rate limit controller 150 may output an additional number of tokens for increasing the current number of tokens of the first rate limiter $130_1$. Outputting an adjusted token distribution to any one of the rate limiters $130_{1,2,\ldots M}$ may be done in a similar manner to that described with reference to the first rate limiter $130_1$.

In accordance with an embodiment, steps 206 to 210 of the method are repeated for further requests for additional tokens from any of the rate limiters $130_{1,2,\ldots N}$. In other words, the rate limit controller 150 receives a plurality of requests for additional tokens from at least some of the rate limiters $130_{1,2,\ldots N}$, and accordingly adjusts and outputs the token distribution of each requesting rate limiter $130_{1,2,\ldots N}$.

Figure 3A:
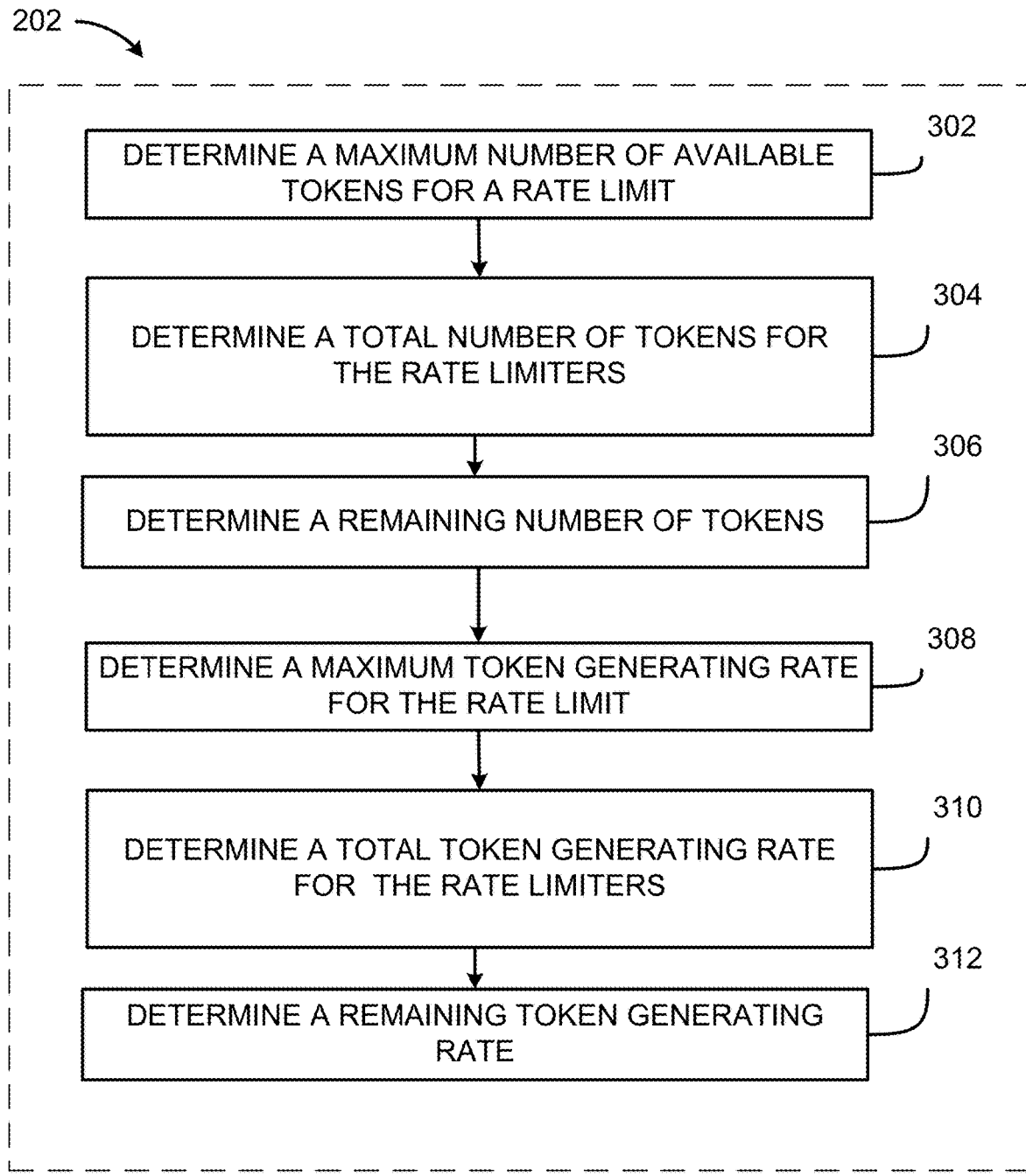
FIG. 3A is a flowchart illustrating the step of FIG. 2 of determining a token distribution for each one of a plurality of rate limiters of a cluster of service instances based on a rate limit in accordance with an embodiment.

With reference to FIG. 3A, there is illustrated an example embodiment of the step 202 of FIG. 2 of determining the token distribution. In this example, the rate limit controller 150 determines the token distribution for each one of the rate limiters $130_{1,2,\ldots,M}$ based on a rate limit. A rate limit of combining multiple dimensions (or types) may be referred to as a sub-rate-limit or a sub-limit. For example, a limit L is for all the tenants to call application X; limit M is for tenant A to call application X; limit N is for tenant B to call application X. Then, limit M and N are sub-limits of limit L, and M+N<=L. Limit L can be called a super-rate-limit or a super limit of M and N. A sub-rate-limit is also a rate-limit. Multiple sub-rate-limits can be split in one dimension (for example, the tenant dimension as described above) on their super-rate-limit (for example, application X as described above).

At step 302, the rate limit controller 150 determines a maximum number of available tokens for the rate limit. For example, the maximum number of available tokens may be a maximum number of tokens for assignment to the rate limiters $130_{1,2,\ldots,M}$ for rate limiting tenant A. At step 304, the rate limit controller 150 determines a total number of tokens to be assigned to the rate limiters $130_{1,2,\ldots,M}$. The total number of tokens is a summation of the maximum token numbers for assignment to the rate limiters $130_{1,2,\ldots,M}$. The total number of tokens is lower than or equal to the maximum number of available tokens for the rate limit. In other words, each one of the maximum token numbers for assignment to the rate limiters $130_{1,2,\ldots,M}$ is determined such that the total number of tokens does not exceed the maximum number of available tokens for the rate limit. For example, if tenant A has a maximum of 100 available tokens, the rate limit controller 150 may allocate a percentage (e.g., 80%) of the maximum number of available tokens to the rate limiters $130_{1,2,\ldots,M}$. The tokens to be allocated to the rate limiters $130_{1,2,\ldots,M}$ may be allocated uniformly or non-uniformly. At step 306, the rate limit controller 150 determines a remaining number of tokens (e.g., 20%) from the difference between the maximum number of available tokens for the rate limit and the total number of tokens for the rate limiters $130_{1,2,\ldots,M}$.

At step 308, the rate limit controller 150 determines a maximum token generating rate for the rate limit. For example, the maximum token generating rate may be a maximum token generating rate for assignment to the rate limiters $130_{1,2,\ldots,M}$ for rate limiting tenant A. At step 310, the rate limit controller 150 determines a total token generating rate to be assigned to the rate limiters $130_{1,2,\ldots,M}$ by computing a summation of the token generating rates for the rate limiters $130_{1,2,\ldots,M}$. The total token generating rate is lower than or equal to the maximum token generating rate determined at step 308. In other words, the token generating rate for each rate limiter $130_{1,2,\ldots,M}$ is determined such that the total token generating rate does not exceed the maximum token generating rate. For example, if tenant A has a maximum token generating rate of 100 tokens, the rate limit controller 150 may allocate (uniformly or non-uniformly) a percentage of the maximum token generating rate to the rate limiters $130_{1,2,\ldots,M}$. At step 312, a remaining token generating rate is determined by computing the difference between the maximum token generating rate determined at step 308 and the total token generating rate determined at step 310.

Figure 3B:
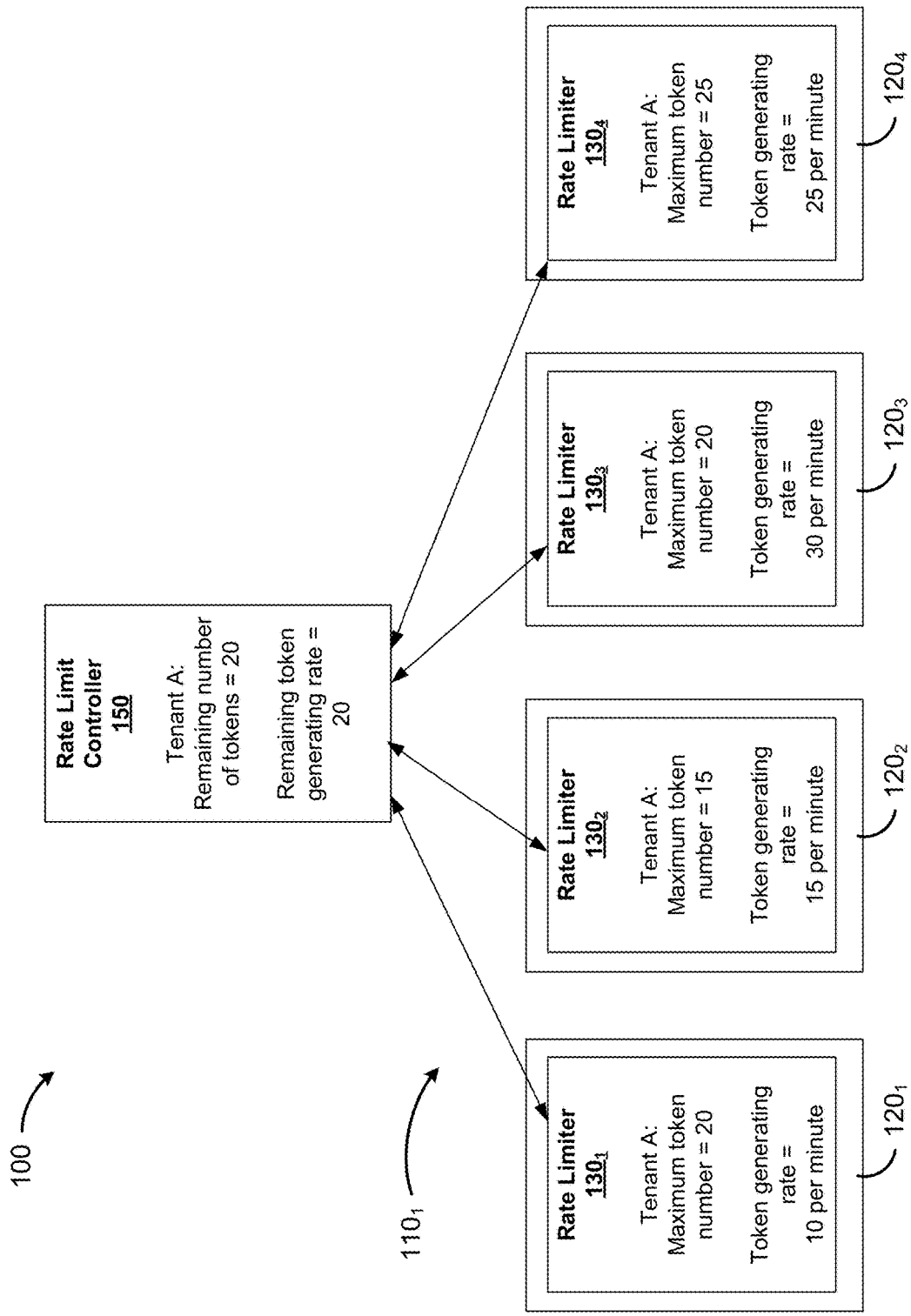
FIG. 3B is a logical block diagram of the rate limit controller, the service instances and the rate limiters of FIG. 1B, and illustrates token distributions for a tenant in accordance with an embodiment.

With additional reference to FIG. 3B, an example of token distributions for rate limiting tenant A is shown to further illustrate the process of FIG. 3A. Token distributions are shown for four rate limiters $130_1$, $130_2$, $130_3$, and $130_4$, which are used for rate limiting four service instances $120_1$, $120_2$, $120_3$, and $120_4$. Tenant A is rate limited such that tenant A has a maximum of 100 available tokens (e.g., as determined at step 302). The rate limiters $130_1$, $130_2$, $130_3$ and $130_4$ are allocated 20, 15, 20 and 25 tokens, respectively, as the maximum token numbers. The total number of tokens for the four rate limiters $130_1$, $130_2$, $130_3$ and $130_4$ is 20+15+20+25=80 tokens (e.g., as determined at step 304). The remaining number of tokens is 100−80=20 tokens (e.g., as determined at step 306). Also, tenant A has a total token generating rate of 100 tokens per minute (e.g., as determined at step 308). The four rate limiters $130_1$, $130_2$, $130_3$ and $130_4$ are allocated 10, 15, 30 and 25 tokens per minute, respectively, as the token generating rate. The total token generating rate for the four rate limiters $130_1$, $130_2$, $130_3$ and $130_4$ is 10+15+30+25=80 tokens per minute (e.g., as determined at step 310). The remaining token generating rate is 100−80=20 (e.g., as determined at step 312). The rate limit controller 150 may adjust the token distributions of the four rate limiters $130_1$, $130_2$, $130_3$ and $130_4$ using the remaining number of tokens and/or the remaining token generating rate, as is described elsewhere in this document.

While the process of FIG. 3A is described by way of a single rate limit, the process of FIG. 3A may be repeated for a plurality of rate limits. For example, the process of FIG. 3A may be repeated for each rate limiting dimension, such as each one a plurality of tenants, each one of a plurality of applications. In other words, each tenant and/or each application may have a rate limit associated therewith. In accordance with an embodiment, the rate limit associated with a given tenant comprises a maximum number of available tokens for the given tenant and a maximum token generating rate for the given tenant. In accordance with an embodiment, the rate limit associated with a given application comprises a maximum number of available tokens for the given application and a maximum token generating rate for the given application. Accordingly, the rate limit associated with a given rate limit dimension (e.g., a tenant, an application, etc.) may comprise a maximum number of available tokens for the given rate limit dimension and a maximum token generating rate for the given rate limit dimension.

Figure 4A:
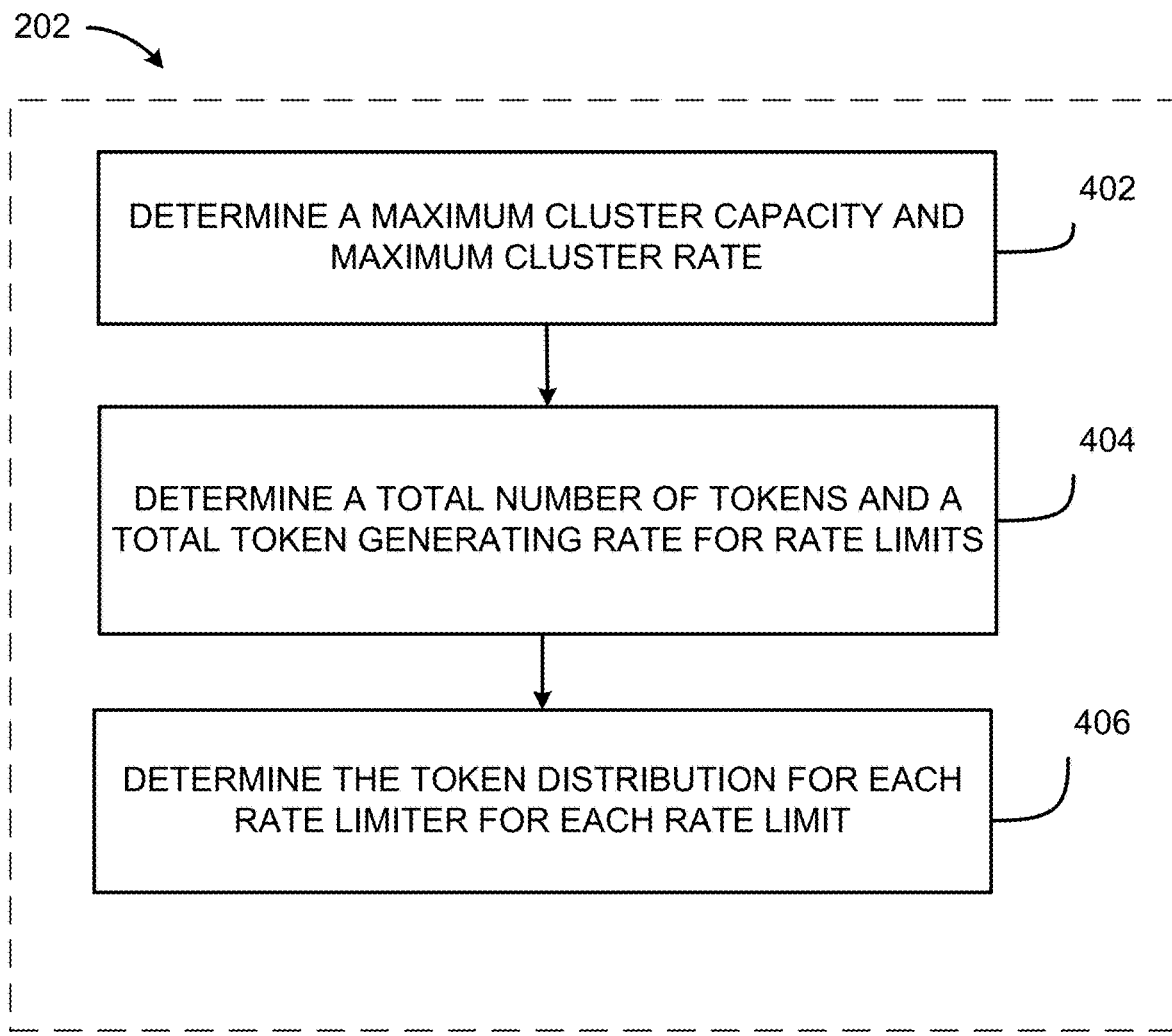
FIG. 4A is a flowchart illustrating the step of FIG. 2 of determining a token distribution for each one of a plurality of rate limiters based on a maximum cluster capacity and a maximum cluster rate in accordance with an embodiment.

With reference to FIG. 4A, there is illustrated another example embodiment for determining the token distributions of step 202 of FIG. 2. In this embodiment, the rate limit controller 150 determines the token distribution for each limiter $130_{1,2,\ldots,M}$ based on a maximum cluster capacity and a maximum cluster rate for the distributed computing cluster $110_1$. The maximum cluster capacity is a maximum number of tokens from which the rate limit controller 150 may allocate tokens to each rate limit in a rate limit dimension. The maximum cluster rate is a maximum token generating rate from which the rate limit controller 150 may allocate a token generating rate to each rate limit in a rate limit dimension. At step 402, the rate limit controller 150 determines the maximum cluster capacity and the maximum cluster rate for the cluster $110_1$. The maximum cluster capacity and the maximum cluster rate may be predetermined values. The determination of the maximum cluster capacity and the maximum cluster rate may vary depending on practical implementations. In some embodiments, the maximum cluster capacity and the maximum cluster rate are determined for the number of calls to each API running on the first cluster $110_1$. In other words, the number of calls to each API running on the first cluster $110_1$ may have a maximum cluster capacity and a maximum cluster rate associated therewith. The maximum cluster capacity and the maximum cluster rate may be determined for each rate limit dimension. Accordingly, each rate limit dimension may have a maximum cluster capacity and a maximum cluster rate associated therewith. The maximum cluster capacity and the maximum cluster rate may be determined for each rate limit dimension (e.g., application, tenant, etc.) Similarly, each rate limit dimension (e.g. application, tenant, etc.) may have a maximum cluster capacity and a maximum cluster rate associated therewith.

At step 404, the rate limit controller 150 determines a total number of tokens for the rate limits, the total number of tokens for the rate limits being lower than or equal to the maximum cluster capacity. Each rate limit has a maximum number of available tokens (as previously described), and the total number of tokens for the rate limits is a summation of the maximum number of available tokens. The rate limit controller 150 also determines a total token generating rate for the rate limits, the total token generating rate for the rate limits being lower than or equal to the maximum cluster rate. Each rate limit has a maximum token generating rate (as previously described), and the total token generating rate for the rate limits is a summation of the maximum token generating rates.

At step 406, the rate limit controller 150 determines the token distribution for each rate limiter $130_{1,2,\ldots,M}$ and for each rate limit. For example, the process of FIG. 3A may be repeated for each one of the rate limits. The determination of the token distribution for each rate limiter $130_{1,2,\ldots,M}$ may vary depending on the type of rate limits associated with the rate limiter.

Figure 4B:
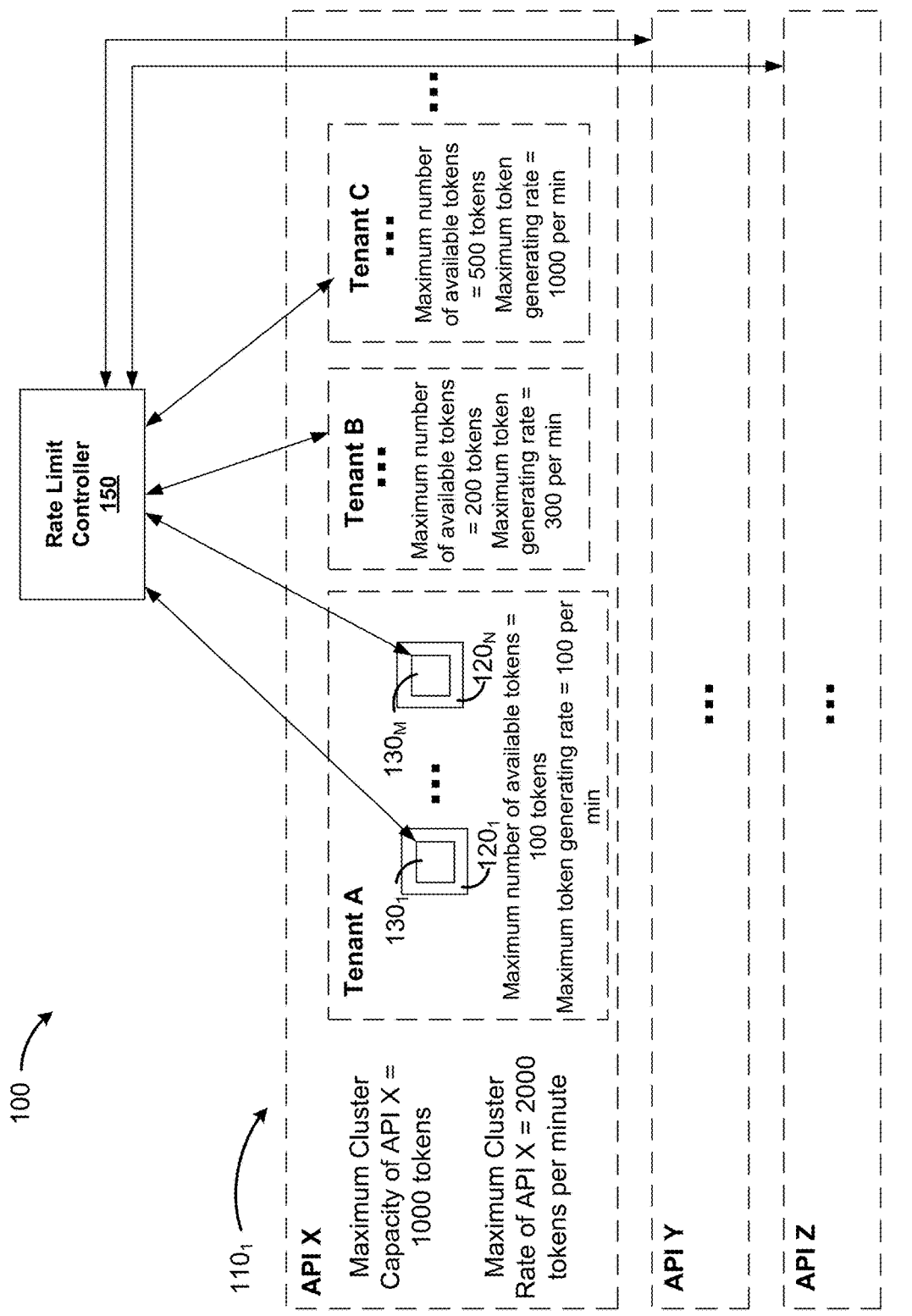
FIG. 4B is a block diagram of the rate limit controller, the service instances and the rate limiters of FIG. 1B, and illustrates tokens and token generating rates allocated to tenants in accordance with an embodiment.

With additional reference to FIG. 4B, an example of token allocation from a maximum cluster capacity and a maximum cluster rate is shown to further illustrate the process of FIG. 4A. In this example, three tenants A, B and C of the cloud 10 have access to a cluster of instances of API service X for making requests of instances of the API service X. Each of the tenants A, B and C has a rate limit for making requests for instances of the API service X, the rate limit being defined by the maximum number of available tokens and the maximum token generating rate. In this example, the rate limit controller 150 determines at step 402 that a cluster of instances of API service X has a maximum cluster capacity of 1000 tokens and a maximum cluster rate of 2000 tokens per minute. In this example, the rate limit controller 150 determines at step 404 the maximum number of available tokens and the maximum token generating rate for each one of the plurality tenants A, B and C. In this example, the first tenant A has a rate limit comprising a maximum number of 100 available tokens and a maximum token generating rate of 100 tokens per minute; the second tenant B has a rate limit comprising a maximum number of 200 available tokens and a maximum token generating rate of 300 tokens per minute; and the third tenant C has a rate limit comprising a maximum number of 500 available tokens and a maximum token generating rate of 1000 tokens per minute. In this example, each token corresponds to a request for an instance of the API service X. The rate limits for each tenant may be determined based on services purchased by each of the tenants. For example, tenant C may pay more than tenants A and B, and may therefore be allocated a higher maximum number of available tokens and a higher maximum token generating rate.

The summation of the maximum number of available tokens of each rate limit is less than or equal to the maximum cluster capacity. For example, for a maximum cluster capacity of 1000 tokens, the summation of the maximum number of available tokens of tenants A, B and C is 100+200+500=800 tokens, which is less than 1000 tokens. Similarly, the summation of the maximum token generating rate for each rate limit is less than or equal to the maximum cluster rate. For example, for a maximum cluster rate of 2000 tokens per minute, the summation of the maximum token generating rate of tenants A, B and C is 100+300+1000=1400 tokens per minute, which is less than 2000 tokens per minute. Accordingly, the maximum number of available tokens for each rate limit may be determined such that the summation of the maximum number of available tokens of the plurality of rate limits does not exceed the maximum cluster capacity. Similarly, the maximum token generating rate for each rate limit may be determined such that the summation of the maximum token generating rate of the plurality of rate limits does not exceed the maximum cluster rate.

Figure 4C:
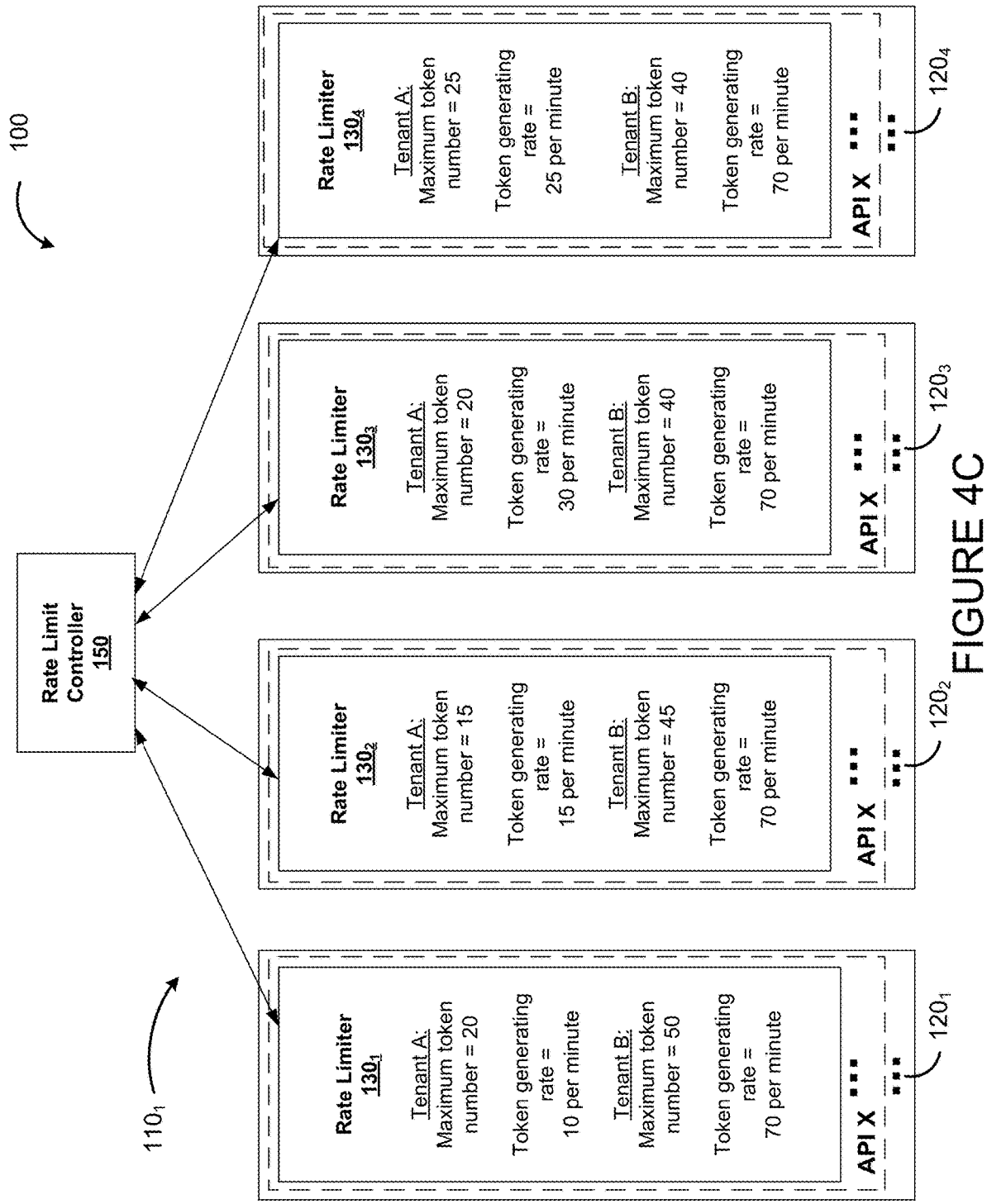
FIG. 4C is a block diagram of the rate limit controller, the service instances and the rate limiters of FIG. 1B, and illustrates token distributions of a plurality of rate limits in accordance with an embodiment.

With additional reference to FIG. 4C, an example of token distributions for rate limiting tenants A and B is shown to further illustrate step 406 of FIG. 4A based on the example described in relation to FIG. 4B. The illustrated token distributions for rate limiting tenant A are the same as illustrated in FIG. 3B. Also illustrated are token distributions for the four rate limiters $130_1$, $130_2$, $130_3$ and $130_4$ for rate limiting tenant B. The four rate limiters $130_1$, $130_2$, $130_3$ and $130_4$ are respectively allocated 50, 45, 40 and 40 tokens as the maximum token numbers for rate limiting tenant B. The total number of tokens for rate limiting tenant B by the four rate limiters $130_1$, $130_2$, $130_3$ and $130_4$ is 175 and the remaining number of tokens is 25 tokens for tenant B. Also, each one of the four rate limiters $130_1$, $130_2$, $130_3$ and $130_4$ is allocated 70 tokens per minute as the token generating rate for rate limiting tenant B. The total token generating rate for rate limiting tenant B by the four rate limiters $130_5$, $130_6$, $130_7$ and $130_8$ is 280 tokens per minute and the remaining token generating rate is 20 tokens per minute for tenant B. The rate limit controller 150 may adjust the token distributions of the rate limiters $130_1$, $130_2$, $130_3$ and $130_4$ using the remaining number of tokens and/or the remaining token generating rate for the rate limit on tenant A and using the remaining number of tokens and/or the remaining token generating rate for the rate limit on tenant B.

In some embodiments, the rate limit controller 150 determines the maximum number of available tokens and the maximum token generating rate for each one of a plurality applications in a similar manner to that described with reference to the plurality of tenants. Accordingly, the plurality of rate limits may be associated with the plurality of applications. In some embodiments, the rate limit controller 150 determines the maximum number of available tokens and the maximum token generating rate for each tenant and for each application. In other words, in some embodiments, the plurality of rate limits are associated with the plurality of tenants and the plurality of applications. The determination of the maximum number of available tokens and the maximum token generating rate for each one of the plurality of rate limits may vary depending on practical implementations.

In accordance with an embodiment, regardless of how the rate limits are configured in different rate limiting dimensions, for any type of request there is a maximum cluster capacity that the plurality of service instances can handle (e.g., a total number of API calls per a second, in all rate limiting dimensions).

The rate limiters $130_{1,2,\ldots,M}$ should in many cases be able to rate limit the service instances $120_{1,2,\ldots,N}$ without requesting additional tokens from the rate limit controller 150. However, for example, when a given rate limiter is using up tokens (e.g., is low on tokens or has no tokens), the rate limiter can request additional tokens from the rate limit controller 150. Accordingly, this may reduce network traffic between the rate limit controller 150 and the rate limiters 130$_{1,2,\ldots M}$.

Figure 5A:
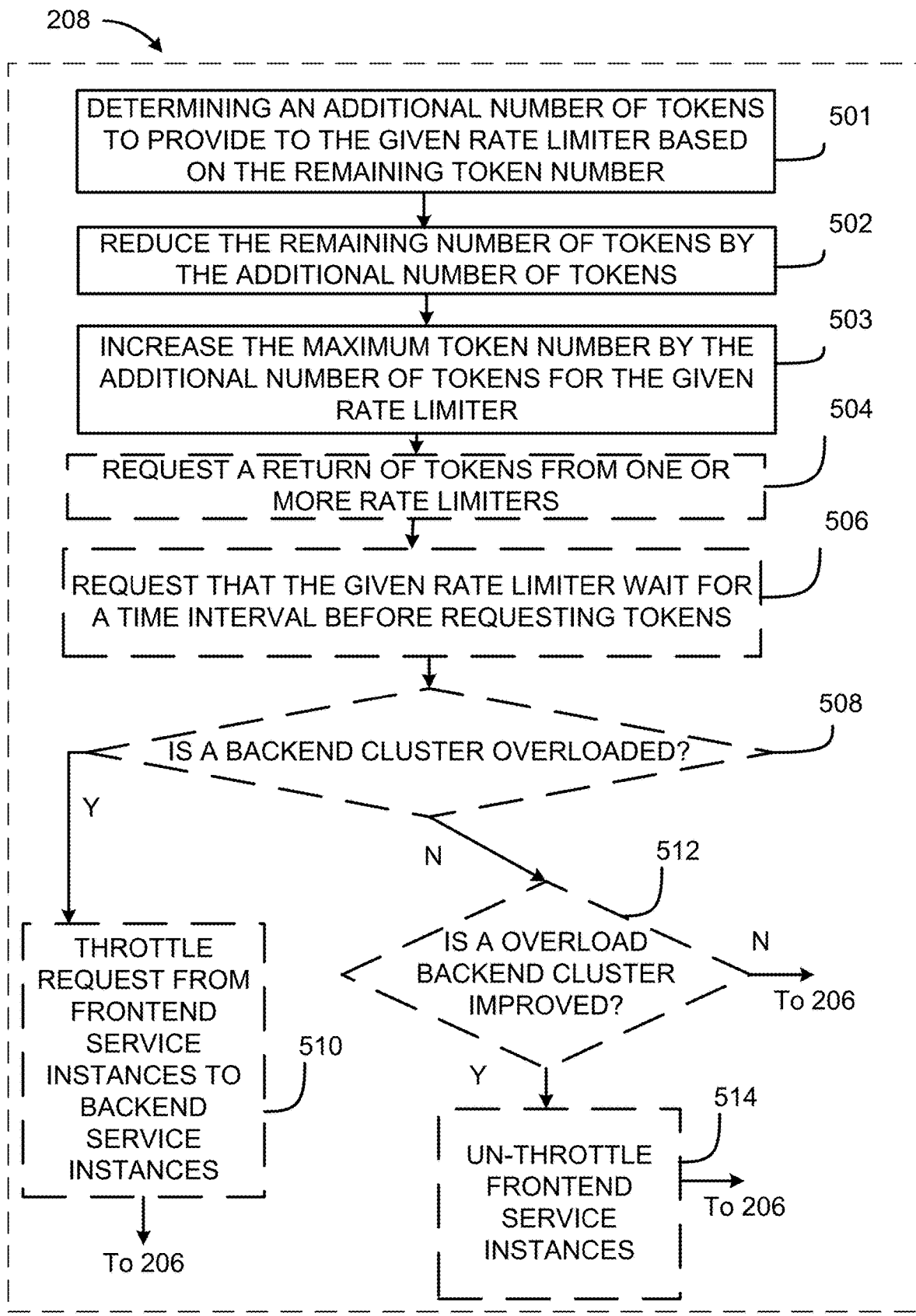
FIG. 5A is a flowchart illustrating the step of FIG. 2 of adjusting a token distribution in accordance with an embodiment.

With reference to FIG. 5A, there is illustrated an example embodiment of the step of adjusting the token distribution of the given rate limiter (step 208 of FIG. 2). At step 501, after receiving a request for additional tokens from the given rate limiter at step 206, the rate limit controller 150 determines an additional number of tokens to provide to the given rate limiter for the maximum token number based on the remaining number of tokens and the token consumption information of at least the given rate limiter. In accordance with an embodiment, the additional number of tokens to provide to the given rate limiter is for a given rate limit. The additional number of tokens may be determined based on the overall token consumption information for the given rate limit. For the sake of example, the given rate limiter may be the first rate limiter 130$_1$ and the given rate limit may be for rate liming tenant A. The rate limit controller 150 may determine the additional number of tokens to provide to the first rate limiter 130$_1$ for the maximum token number as a function of the remaining number of tokens. The additional number of tokens to provide to the first rate limiter 130$_1$ may be a percentage of the remaining number of tokens for tenant A. In this case, as the remaining number of tokens is decreased with each subsequent request, the additional number of tokens to provide for each subsequent request would accordingly be decreased. If the additional number of tokens is 1 token, then effectively the first rate limiter 130$_1$ is tightly controlled by the rate limit controller 150. When the remaining number of tokens is 0, then the rate limit controller 150 has no more tokens to assign. The rate limit controller 150 may determine the additional number of tokens to provide to the first rate limiter 130$_1$ as a function of the remaining number of tokens and the token consumption information of one or more of the first plurality of rate limiters 130$_{1,2,\ldots M}$ (i.e., the overall token consumption information). For example, the trends of the first plurality of rate limiters 130$_{1,2,\ldots M}$ may be used in determining the additional number of tokens to provide to the first rate limiter 130$_1$. In some embodiments, a prediction learning algorithm uses the consumption information (e.g., historical data) and/or the trends from the first plurality of rate limiters 130$_{1,2,\ldots M}$ to determine the additional number of tokens to provide to the first rate limiter 130$_1$.

At step 502, the rate limit controller 150 reduces the remaining number of tokens by the additional number of tokens. Continuing with the example of the given rate limiter being the first rate limiter 130$_1$ and the rate limit limiting tenant A, the remaining number of tokens for tenant A is reduced by the additional number of tokens to be provided to the first rate limiter 130$_1$.

At step 503, the rate limit controller 150 increases the maximum token number by the additional number of tokens for the given one of the plurality of rate limiters. Continuing with the example of the given rate limiter being the first rate limiter 130$_1$ and the rate limit limiting tenant A, the maximum token number of the first rate limiter 130$_1$ for tenant A is increased by the additional number of tokens to be provided to the first rate limiter 130$_1$.

Figure 5B:
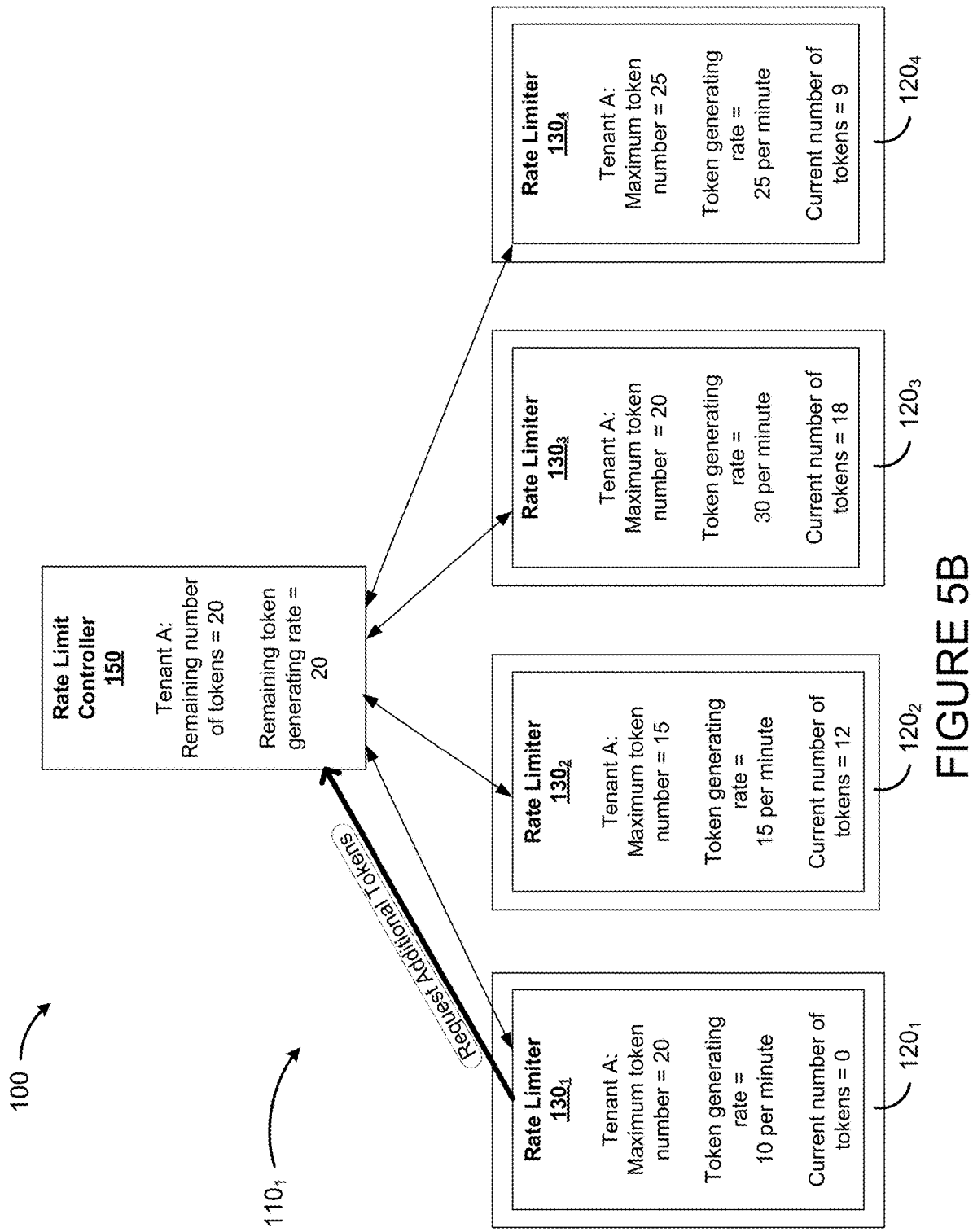
FIG. 5B is a block diagram of the rate limit controller, the service instances and the rate limiters of FIG. 1B, and illustrates a rate limiter requesting additional tokens from the rate limit controller in accordance with an embodiment.
Figure 5C:
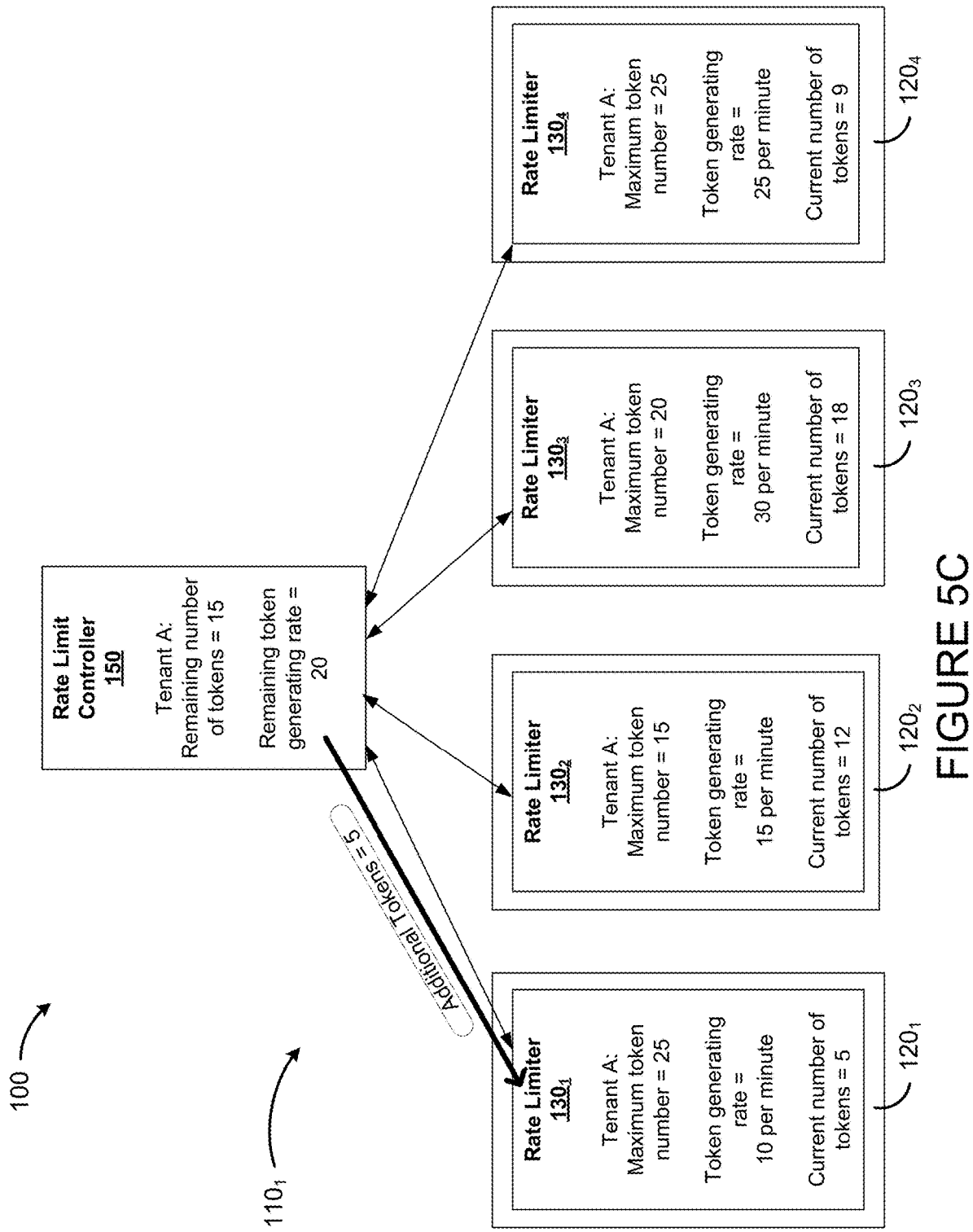
FIG. 5C is a block diagram of the rate limit controller, the service instances and the rate limiters of FIG. 1B, and illustrates a rate limiter being assigned additional tokens in accordance with an embodiment.

With additional reference to FIGS. 5B and 5C, the adjusting of the token distribution of the first rate limiter 130$_1$ is illustrated based on the example token distributions of FIG. 3B. In FIG. 5B, the first rate limiter 130$_1$ has requested additional tokens, as the first rate limiter 130$_1$ has 0 tokens. The first rate limiter 130$_1$ provides its consumption information with the request for additional tokens. The remaining number of tokens in the rate limit controller 150 of this example is 20 tokens. In this example, the rate limit controller 150 determines that the additional number of tokens to be provided is 5 tokens. In FIG. 5C, the rate limit controller 150 assigns 5 additional tokens to the first rate limiter 130$_1$ for the maximum token number. In this example, the number for the first rate limiter 130$_1$ is increased from 20 tokens to 25 tokens. In this example, the current number of tokens for the first rate limiter 130$_1$ is increased from 0 tokens to 5 tokens.

In some embodiments, the rate limit controller 150 determines an additional token generating rate to provide to the given rate limiter based on the remaining token generating rate and the token consumption information of at least the given rate limiter. The additional token generating rate may be determined in a similar manner to the additional number of tokens. For example, the additional token generating rate may be a function (e.g., a percentage) of the remaining token generating rate. The rate limit controller 150 may also determine the additional token generating rate as a function of the remaining token generating rate and the token consumption information of one or more of the rate limiters 130$_{1,2,\ldots M}$ (i.e., the overall token consumption information). For example, the trends of the rate limiters 130$_{1,2,\ldots M}$ may be used in determining the additional token generating rate. In some embodiments, a prediction learning algorithm uses the consumption information (e.g., historical data) and/or the trends from the rate limiters 130$_{1,2,\ldots M}$ to determine the additional token generating rate. In some embodiments, the rate limit controller 150 reduces the remaining token generating rate by the additional token generating rate. In some embodiments, the rate limit controller 150 increases the token generating rate of the given rate limiter by the additional token generating rate for the given rate limiter.

Referring back to FIG. 5A, in some embodiments, at step 504, the rate limit controller 150 requests a return of tokens from one or more of the rate limiters 130$_{1,2,\ldots M}$. The request for the return of tokens may be made when the remaining number of tokens is less than a threshold value. For example, if the remaining number of tokens is less than a predetermined percentage of the maximum number of available tokens for a rate limit, then the rate limit controller 150 may request the return of tokens. The rate limit controller 150 may determine to which ones of the limiters 130$_{1,2,\ldots M}$ to request a return of tokens. For example, the rate limit controller 150 may select rate limiters that have not requested additional tokens within a predetermined time interval. Thus, the rate limit controller 150 may collect unused tokens from less demanding rate limiters to be used for more demanding rate limiters. When a given rate limiter returns an amount of tokens, the given rate limiter may reduce its maximum token number and/or its current number of tokens by the returned amount of tokens. Similarly, when the rate limit controller 150 receives an amount of tokens returned by a given rate limiter, the rate limit controller 150 may increase its remaining number of tokens by the returned amount of tokens. When the rate limit controller 150 receives an amount of tokens returned by a given rate limiter, the rate limit controller 150 may allocate the returned amount of tokens to another rate limiter.

In some embodiments, at step 506, when the remaining number of tokens is zero, the rate limit controller 150 requests that the given rate limiters wait for a time interval to elapse prior to requesting additional tokens.

In some embodiments, the first cluster $110_1$ is a cluster of frontend instances and the second cluster $110_2$ is a cluster of backend services. In some embodiments, at step 508, the rate limit controller 150 determines if the cluster of backend service instances is overloaded. At step 510, when it is determined that the cluster of backend service instances is overloaded, the rate limit controller 150 throttles (e.g., slows down or stops) requests from service instances of the frontend cluster of service instances to the backend cluster of service instances. Throttled requests from service instance of the cluster of front end service instances may be stored temporarily in queues in the frontend cluster of service instances or rejected by the frontend cluster of service instances. In some embodiments, at step 512, the rate limit controller 150 determines if a previously overloaded backend cluster of service instances has improved such that it is no longer overloaded. At step 514, when it is determined that the previously overloaded backend cluster of service instances has improved (e.g., is no longer overloaded), the rate limit controller 150 un-throttles the requests from service instances of the frontend cluster of service instances to service instances of the backend cluster of service instances.

Figure 6:
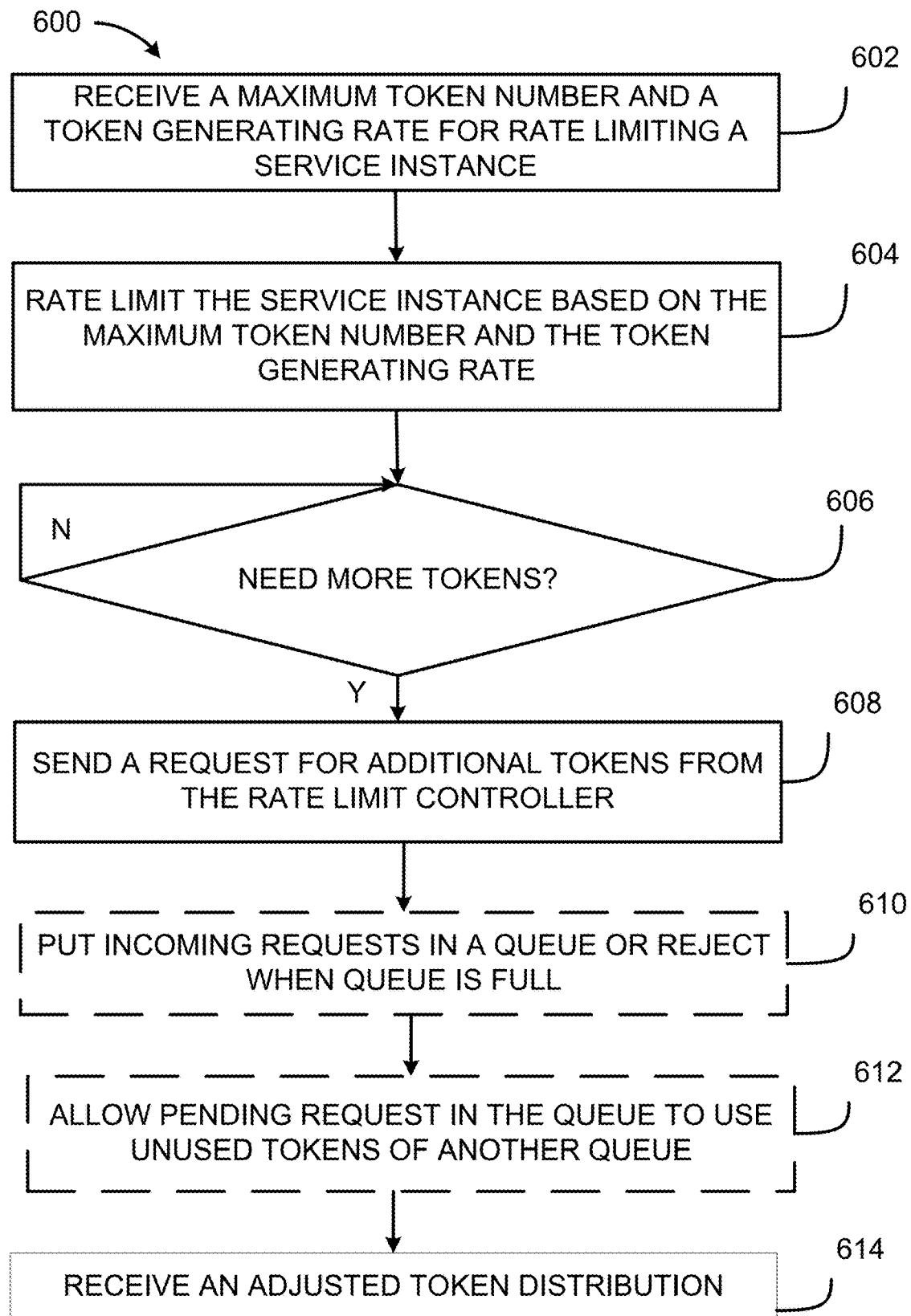
FIG. 6 is a flowchart illustrating an example method for rate limiting a service instance in accordance with an embodiment.

With reference to FIG. 6, there is shown a flowchart illustrating an example method 600 for rate limiting a service instance. The method 600 is implemented by a rate limiter (e.g., the first rate limiter $130_1$ of FIG. 1B) for rate limiting a service instance (e.g., the first service instance $120_1$ of FIG. 1B). While the method 600 is herein explained with reference to the first rate limiter $130_1$, the method 600 may be performed by any of rate limiters described herein.

At step 602, the first rate limiter $130_1$ receives the maximum token number and the token generating rate for rate limiting the first service instance $120_1$ according to a given rate limit. At step 604, the first rate limiter $130_1$ rate limits the first service instance $120_1$ based on the maximum token number and the token generating rate. For example, if each token corresponds to a request for an API call, each time the API service instance $120_1$ serves the request, the first rate limiter $130_1$ deducts a token from the current number of tokens. When the current number of tokens is less than the maximum token number, the first service instance $120_1$ increases the current number of tokens according to the token generating rate.

At step 606, the first rate limiter $130_1$ determines if more tokens are needed. For example, if the current number of tokens is below a threshold, the first rate limiter $130_1$ may determine that more tokens are needed. By way of another example, if the current number of tokens is decreasing at a rate that exceeds a threshold, the first rate limiter $130_1$ may determine that more tokens are needed. In some embodiments, the first rate limiter $130_1$ determines if tokens are not being generated fast enough to meet the decreasing rate of the current number of tokens. The first rate limiter $130_1$ may monitor token consumption and record the token consumption information. For example, the first rate limiter $130_1$ may determine the consumption rate, the historical data, the trends and/or any other suitable information. The first rate limiter $130_1$ may determine that more tokens are needed based on the token consumption information. The first rate limiter $130_1$ may determine that additional tokens are needed based on a prediction learning from the historical data and/or the trends.

At step 608, when it is determined that more tokens are needed, the first rate limiter $130_1$ sends a request for additional tokens to the rate limit controller 150. In accordance with an embodiment, the request includes the consumption information of the first rate limiter $130_1$. It should be understood that, in addition to requesting additional tokens, the request may also comprise a request for an increase in the token generating rate. The request from the first rate limiter $130_1$ comprises information to identify the first rate limiter $130_1$ and/or the information to identify the given rate limit.

In some embodiments, at step 610, the first rate limiter $130_1$ puts incoming requests into a queue associated with a rate limit when the current number of tokens of the rate limit is zero. If the queue is full, the first rate limiter $130_1$ may reject the requests. When new tokens are generated based on the token generating rate or received from the rate limit controller 150, the requests in the queue are processed by the first service instance $120_1$ before any incoming requests. Different sub-rate-limits (e.g., different tenants) of a rate limit (e.g., application calls per second) may be associated with different queues in a given rate limiter.

In some embodiments, at step 612, the first rate limiter $130_1$ may allocate to a given queue unused tokens of another queue when the given queue has pending requests. This may be done, for example, if these queues' rate-limits share a super-rate-limit. For example, queue L's limit is for tenant A to call application X; queue M's limit is for tenant B to call application X; queue N's limit is for tenant C to call application X. There may be policies configured to allow pending requests in a queue to share unused tokens of an empty queue as long as the capacity of the first cluster $110_1$ that includes the first service instance $120_1$ is not exceeded. The policies may define different priorities among queues and how many unused tokens in a queue may be used by another queue. A high priority queue may use the unused tokens before lower priority queues use them. For example, if queue L and M have pending requests, queue N has unused tokens and no pending requests, and queue L has a higher priority than queue M (e.g., because tenant A paid more than tenant B), then queue L's pending requests can use queue N's unused tokens before (or more than) queue M based on defined policies.

At step 614, the first rate limiter $130_1$ receives the adjusted token distribution. The first rate limiter $130_1$ may receive the adjusted maximum token number and/or the adjusted token generating rate. The first rate limiter $130_1$ may receive an additional number of tokens to be added to the current number of tokens. The first rate limiter $130_1$ then rate limits the first service instance $120_1$ based on the adjusted token distribution.

It should thus be appreciated that the rate limit controller 150 may use the remaining number of tokens and/or the remaining token generating rate adaptively and collaboratively on demand among the rate limiters $130_{1,2,\ldots M}$ for rate limiting the service instances $120_{1,2,\ldots N}$.

With reference to FIG. 7, an example physical machine 34 of the IaaS layer 12 is shown. In this embodiment, the physical machine 34 is a computing device 910, comprising at least one processing unit 912 and at least one memory 914 which has stored therein computer-executable instructions 916. The processing unit 912 may comprise any suitable devices configured to implement the system such that instructions 916, when executed by the computing device 910 or other programmable apparatus, may cause the functions/acts/steps of the method 200 as described herein to be executed. The processing unit 912 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 914 may comprise any suitable known or other machine-readable storage medium. The memory 914 may comprise non-transitory computer readable storage medium, for example, but not limited to, an electronic, magnetic, optical, electromagnetic, infrared, or semiconductor system, apparatus, or device, or any suitable combination of the foregoing. The memory 914 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 914 may comprise any storage means (e.g., devices) suitable for retrievably storing machine-readable instructions 916 executable by processing unit 912.

The methods and systems described herein may be implemented in a high level procedural or object oriented programming or scripting language, or a combination thereof, to communicate with or assist in the operation of a computer system, for example the computing device 910. Alternatively, the methods and systems described herein may be implemented in assembly or machine language. The language may be a compiled or interpreted language. Program code for implementing the methods and systems described herein may be stored on a physical storage 36 (e.g. physical storage media or a physical storage device), for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 912 of the computing device 910, to operate in a specific and predefined manner to perform the functions described herein.

Computer-executable instructions may be in many forms, including program modules, executed by one or more physical machines 34. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method of rate limiting clusters of distributed service instances running on distributed compute servers over a network in a cloud computing system, the method comprising:

receiving, at a rate limit controller, a request to determine a token distribution for each one of a plurality of distributed rate limiters, each rate limiter associated with one of the clusters of distributed service instances, each one of the plurality of distributed rate limiters rate limiting a service instance of a corresponding one of the clusters of distributed service instances;

determining, at the rate limit controller, the token distribution for each one of the plurality of distributed rate limiters and remaining distribution in the rate limit controller, the token distribution comprising a maximum token number and a token self-generating rate to generate tokens by each distributed rate limiter and generate remaining tokens by the rate limit controller to minimize interactions between the rate limit controller and distributed rate limiters over the network;

outputting, by the rate limiting controller, the maxim urn token number and the token self-generating rate to each one of the plurality of distributed rate limiters;

receiving, from at least a first rate limiter of the plurality of distributed rate limiters, at least a first request for additional tokens; and outputting an adjusted token distribution to the first rate limiter, the adjusted token distribution including at least one of an adjusted maximum token number or an adjusted token self-generating rate based on the first request and based on token consumption information for at least the first rate limiter of the plurality of distributed rate limiters.

2. The method of claim 1, wherein the adjusted token distribution is determined based on overall token consumption information of the plurality of distributed rate limiters.

3. The method of claim 1, wherein determining the token distribution for each one of the plurality of distributed rate limiters comprises determining a total number of tokens to be assigned to the plurality of distributed rate limiters, the total number of tokens lower than or equal to a maximum number of available tokens for the plurality of distributed rate limiters.

4. The method of claim 3, wherein the total number of tokens to be assigned to the plurality of distributed rate limiters is determined for each one of a plurality of rate limiting dimensions.

5. The method of claim 3, wherein determining the token distribution further comprises obtaining a number of the remaining tokens in the rate limit controller by computing a difference between the maximum number of available tokens and the total number of tokens.

6. The method of claim 5, wherein determining the token distribution comprises determining a total token self-generating rate to be assigned to the plurality of distributed rate limiters, the total token self-generating rate lower than or equal to a maxim urn token generating rate of the plurality of distributed rate limiters.

7. The method of claim 6, wherein determining the token distribution further comprises obtaining a remaining token generating rate in the rate limit controller by computing a difference between the maximum token generating rate and the total token self-generating rate.

8. The method of claim 5, wherein adjusting the token distribution comprises:
   determining an additional number of tokens to provide to the first rate limiter of the plurality of distributed rate limiters for the maximum token number based on the number of remaining tokens and the token consumption information of at least the first rate limiter of the plurality of distributed rate limiters;
   reducing the number of remaining tokens by the additional number of tokens; and increasing the maximum token number by the additional number of tokens for the first rate limiter of the plurality of distributed rate limiters.

9. The method of claim 8, wherein determining the additional number of tokens comprises determining the additional number of tokens to provide to the first rate limiter of the plurality of distributed rate limiters based on overall token consumption information of the plurality of distributed rate limiters.

10. The method of claim 9, wherein determining the additional number of tokens comprises determining the additional number of tokens to provide to the first rate limiter of the plurality of distributed rate limiters as a function of the number of the remaining tokens in the rate limit controller.

11. The method of claim 5, further comprising determining, at the rate limiting controller, that the number of the remaining tokens in the rate limit controller is zero and requesting that the first rate limiter of the plurality of distributed rate limiters wait for a time interval to elapse prior to requesting the additional tokens.

12. The method of claim 5, further comprising determining, at the rate limiting controller, that the number of the remaining tokens in the rate limit controller is less than a threshold value and requesting a return of tokens from one or more of the plurality of distributed rate limiters.

13. The method of claim 1, wherein determining the token distribution comprises:
   determining a total number of tokens for the plurality of distributed rate limiters of a first cluster of service instances, the total number of tokens lower than or equal to a maximum number of tokens for the first cluster of service instances;
   determining a total token generating rate for the plurality of distributed rate limiters, the total token generating rate is lower than or equal to a maxim urn token generating rate for the first cluster of service instances; and
   determining the token distribution for each one of the plurality of distributed rate limiters from the maximum number of tokens and the maximum token generating rate for each one of the plurality of distributed rate limiters.

14. The method of claim 13, wherein the rate limit controller or one of the plurality of distributed rate limiters manages rate limits, each of the rate limits having a plurality of rate limit dimensions, and does rate limiting based on the rate limits and the plurality of dimensions for a plurality of service instances.

15. The method of claim 1, wherein the one or more clusters of service instances comprises a cluster of backend service instances and a cluster of frontend service instances, and the method further comprising using the rate limit controller for:
   after determining that the cluster of backend service instances is overloaded for handling too many requests, throttling requests received from service instances of the cluster of frontend service instances so that service instances of the cluster of backend service instances can handle requests without dropping some of the requests.

16. The method of claim 1, wherein the rate limit controller or one of the plurality of distributed rate limiters manages a plurality of rate limits, each of the plurality of rate limits having a plurality of rate limit dimensions, and the first rate limiter of the plurality of distributed rate limiters stores incoming requests into a queue associated with a first rate limit when a current number of tokens of the first rate limit is zero.

17. The method of claim 16, wherein the queue is a first queue of a first rate limit, and wherein the first rate limiter of the plurality of distributed rate limiters allocates to the first queue unused tokens from a second queue of a second rate limit when the first queue has pending requests if there is a token sharing policy between the first rate limit and the second rate limit and wherein the token sharing policy is one of queue priorities, or hierarchical super-limits and sub-limits.

18. A non-transitory computer readable medium storing computer readable instructions, which when executed by a processor, cause the processor to:
   receive a request to determine a token distribution for each one of a plurality of distributed rate limiters, each rate limiter associated with one of clusters of distributed service instances, each one of the plurality of distributed rate limiters rate limiting a service instance of a corresponding one of the clusters of distributed service instances;
   determine the token distribution for each one of the plurality of distributed rate limiters and remaining distribution in a rate limit controller, the token distribution comprising a maximum token number and a token self-generating rate;
   output the maximum token number and the token self-generating rate to each one of the plurality of distributed rate limiters;
   receive, from at least a first rate limiter of the plurality of distributed rate limiters, at least a first request for additional tokens; and
   output an adjusted token distribution to the first rate limiter, the adjusted token distribution including at least one of an adjusted maximum token number or an adjusted token self-generating rate based on the first request and based on token consumption information for at least the first rate limiter of the plurality of distributed rate limiters.

19. The non-transitory computer readable medium claim 18, wherein the adjusted token distribution is determined based on overall token consumption information of the plurality of distributed rate limiters.

20. The non-transitory computer readable medium of claim 18, wherein determining the token distribution for each one of the plurality of distributed rate limiters comprises determining a total number of tokens to be assigned to the plurality of distributed rate limiters, the total number of tokens lower than or equal to a maximum number of available tokens for the plurality of distributed rate limiters.

* * * * *

UNITED STATES PATENT AND TRADEMARK OFFICE
CERTIFICATE OF CORRECTION

PATENT NO. : 10,951,532 B2
APPLICATION NO. : 16/038826
DATED : March 16, 2021
INVENTOR(S) : Hongwu Chen et al.

It is certified that error appears in the above-identified patent and that said Letters Patent is hereby corrected as shown below:

In the Claims

In Column 20, Line 33, Claim 1, delete "maxim urn" and insert --maximum--.

In Column 21, Line 2, Claim 6, delete "maxim urn" and insert --maximum--.

In Column 21, Line 52, Claim 13, delete "maxim urn" and insert --maximum--.

In Column 22, Line 25, Claim 17, delete "second rate limit and" and insert --second rate limit, and--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*